US012153767B2

(12) United States Patent
Sun et al.

(10) Patent No.: US 12,153,767 B2
(45) Date of Patent: Nov. 26, 2024

(54) TOUCH-CONTROL ELECTRODE STRUCTURE, DISPLAY PANEL, AND ELECTRONIC DEVICE

(71) Applicant: BOE Technology Group Co., Ltd., Beijing (CN)

(72) Inventors: Xuefei Sun, Beijing (CN); Jaegeon You, Beijing (CN); Xinxing Wang, Beijing (CN); Liyan Liu, Beijing (CN); Liwei Liu, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 17/789,723

(22) PCT Filed: Mar. 4, 2021

(86) PCT No.: PCT/CN2021/079088
§ 371 (c)(1),
(2) Date: Jun. 28, 2022

(87) PCT Pub. No.: WO2022/183438
PCT Pub. Date: Sep. 9, 2022

(65) Prior Publication Data
US 2024/0168593 A1    May 23, 2024

(51) Int. Cl.
*G06F 3/044*    (2006.01)

(52) U.S. Cl.
CPC ......... *G06F 3/0446* (2019.05); *G06F 3/0448* (2019.05); *G06F 2203/04111* (2013.01)

(58) Field of Classification Search
CPC ............... G06F 3/0446; G06F 3/0448; G06F 2203/04111
See application file for complete search history.

(56) References Cited

U.S. PATENT DOCUMENTS 10,001,889 B2 *  6/2018  Lin ................. G06F 3/0446
2016/0117031 A1    4/2016  Han et al.
(Continued)

FOREIGN PATENT DOCUMENTS

CN    108984046 A    12/2018
CN    109213365 A    1/2019
(Continued)

*Primary Examiner* — Peter D McLoone
(74) *Attorney, Agent, or Firm* — Banner & Witcoff, Ltd.

(57) ABSTRACT

A touch-control electrode structure, display panel, and an electronic device are provided. The touch-control electrode structure includes first touch-control electrodes and second touch-control electrodes; the first touch-control electrodes are arranged along a first direction, and each first touch-control electrode extends in a second direction; the second touch-control electrodes are arranged along the second direction, and each second touch-control electrode extends in the first direction; the first touch-control electrode includes first touch-control sub-electrodes arranged along the second direction; the first touch-control sub-electrode includes a grid-shaped structure; the grid-shaped structure includes a first grid portion and second grid portions, the first grid portion is configured to transmit a touch-control signal, and the second grid portions are spaced apart from and insulated from the first grid portion; and in each first touch-control sub-electrode, the second grid portions are periodically arranged along an extending direction of an edge of the first touch-control sub-electrode.

19 Claims, 10 Drawing Sheets

(56) References Cited

U.S. PATENT DOCUMENTS

| | | | |
|---|---|---|---|
| 2016/0132153 A1* | 5/2016 | Lin | G06F 3/0446 345/174 |
| 2018/0348906 A1* | 12/2018 | Hwang | G06F 3/0445 |
| 2019/0004638 A1 | 1/2019 | Lee et al. | |
| 2019/0258343 A1 | 8/2019 | Hwang et al. | |

FOREIGN PATENT DOCUMENTS

| | | |
|---|---|---|
| CN | 112328119 A | 2/2021 |
| KR | 20110125838 A | 11/2011 |

\* cited by examiner

TOUCH-CONTROL ELECTRODE STRUCTURE, DISPLAY PANEL, AND ELECTRONIC DEVICE

The application is a U.S. National Phase Entry of International Application No. PCT/CN2021/079088 filed on Mar. 4, 2021, designating the United States of America. The present application claims priority to and the benefit of the above-identified application and the above-identified application is incorporated by reference herein in its entirety.

TECHNICAL FIELD

Embodiments of the present disclosure relate to a touch-control electrode structure, a display panel, and an electronic device.

BACKGROUND

User interfaces with touch-control functions are widely used in various electronic devices, such as display devices. The touch-control structure used to implement the touch-control function includes a touch-control electrode structure, and the arrangement of the touch-control electrode structure is an important factor that affects the user experience.

SUMMARY

At least one embodiment of the present disclosure provides a touch-control electrode structure, and the touch-control electrode structure comprises a plurality of first touch-control electrodes and a plurality of second touch-control electrodes; the plurality of first touch-control electrodes are arranged along a first direction, and each of the plurality of first touch-control electrodes extends in a second direction; the plurality of second touch-control electrodes are arranged along the second direction, and each of the plurality of second touch-control electrodes extends in the first direction; each of the plurality of first touch-control electrodes comprises a plurality of first touch-control sub-electrodes, and the plurality of first touch-control sub-electrodes are arranged along the second direction; each of the plurality of first touch-control sub-electrodes comprises a grid-shaped structure formed by a plurality of metal grids; the grid-shaped structure comprises a first grid portion and a plurality of second grid portions, the first grid portion is configured to transmit a touch-control signal, and the plurality of second grid portions are spaced apart from and insulated from the first grid portion; and in each of the plurality of first touch-control sub-electrodes, the plurality of second grid portions are periodically arranged along an extending direction of at least one edge of the first touch-control sub-electrode.

For example, in the touch-control electrode structure provided by an embodiment of the present disclosure, the plurality of second grid portions are arranged at an equal interval in the extending direction of the at least one edge of the first touch-control sub-electrode.

For example, in the touch-control electrode structure provided by an embodiment of the present disclosure, at least part of a pattern formed by each of at least one second grid portion of the plurality of second grid portions is at least partially identical to a shape of one edge of the at least one edge of the first touch-control sub-electrode.

For example, in the touch-control electrode structure provided by an embodiment of the present disclosure, a ratio of the plurality of second grid portions in the grid-shaped structure ranges from 10% to 25%.

For example, in the touch-control electrode structure provided by an embodiment of the present disclosure, a size of a region occupied by each of the plurality of second grid portions in the first direction or the second direction is less than or equal to 0.2 mm.

For example, in the touch-control electrode structure provided by an embodiment of the present disclosure, the first touch-control sub-electrode comprises a plurality of first region units; the first grid portion and the plurality of second grid portions are in the plurality of first region units, and each first region unit of the plurality of first region units comprises one or more second grid portions; and an area ratio of a region occupied by the second grid portion of each first region unit of the plurality of first region units in the each first region unit is identical and is a first area ratio.

For example, in the touch-control electrode structure provided by an embodiment of the present disclosure, a ratio of a size of the first region unit to a size of the first touch-control sub-electrode ranges from 5% to 25%, and the first area ratio ranges from 10% to 25%.

For example, in the touch-control electrode structure provided by an embodiment of the present disclosure, the grid-shaped structure comprises a plurality of cutting openings to form the first grid portion and the plurality of second grid portions, and a count of cutting openings in each first region unit of the plurality of first region units is identical.

For example, in the touch-control electrode structure provided by an embodiment of the present disclosure, a pattern formed by the second grid portion in each first region unit of the plurality of first region units is at least partially identical.

For example, in the touch-control electrode structure provided by an embodiment of the present disclosure, the first touch-control sub-electrode comprises a first edge and a second edge which are opposite to each other in the first direction to form the first touch-control sub-electrode; in the first touch-control sub-electrode, the plurality of second grid portions are periodically arranged along an extending direction of the first edge and an extending direction of the second edge; the first edge of the first touch-control sub-electrode comprises a first sub-edge and a second sub-edge which are connected with each other, the second edge of the first touch-control sub-electrode comprises a third sub-edge and a fourth sub-edge which are connected with each other, the first sub-edge is parallel to the third sub-edge, the second sub-edge is parallel to the fourth sub-edge, and an included angle between the first sub-edge and the fourth sub-edge is equal to an included angle between the second sub-edge and the third sub-edge; and an extending direction of a pattern formed by the second grid portion in each first region unit of the plurality of first region units is parallel to an extending direction of the first sub-edge and the third sub-edge, or is parallel to an extending direction of the second sub-edge and the fourth sub-edge.

For example, in the touch-control electrode structure provided by an embodiment of the present disclosure, at least part of the pattern formed by the second grid portion in each first region unit of the plurality of first region units is at least partially identical to a shape of the first sub-edge and the third sub-edge, or at least part of the pattern formed by the second grid portion in each first region unit of the plurality of first region units is at least partially identical to a shape of the second sub-edge and the fourth sub-edge.

For example, in the touch-control electrode structure provided by an embodiment of the present disclosure, the first sub-edge, the second sub-edge, the third sub-edge, and the fourth sub-edge of the first touch-control sub-electrode respectively extend in a broken line shape.

For example, in the touch-control electrode structure provided by an embodiment of the present disclosure, the first touch-control sub-electrode further comprises a plurality of second region units, and the plurality of second region units are arranged around the plurality of first region units to serve as an edge portion of the first touch-control sub-electrode; the first grid portion and the plurality of second grid portions are further in the plurality of second region units, and each second region unit of the plurality of second region units comprises one or more second grid portions; and an area ratio of a region occupied by the second grid portion of each second region unit of the plurality of second region units in the each second region unit is identical and is a second area ratio.

For example, in the touch-control electrode structure provided by an embodiment of the present disclosure, the second area ratio is identical to the first area ratio.

For example, in the touch-control electrode structure provided by an embodiment of the present disclosure, a count of cutting openings for forming the second grid portion in each second region unit of the plurality of second region units is identical.

For example, in the touch-control electrode structure provided by an embodiment of the present disclosure, a minimum value of a distance between each second grid portion of the plurality of second grid portions and each edge of the first touch-control sub-electrode is approximate to or equal to a minimum value of a distance between different second grid portions.

For example, in the touch-control electrode structure provided by an embodiment of the present disclosure, the first touch-control electrode further comprises at least one connection portion, and each of the at least one connection portion is between two first touch-control sub-electrodes which are adjacent to each other in the second direction, and is integrally formed with the two first touch-control sub-electrodes, so as to connect the two first touch-control sub-electrodes which are adjacent to each other in the second direction.

For example, in the touch-control electrode structure provided by an embodiment of the present disclosure, each of the plurality of second touch-control electrodes comprises a plurality of second touch-control sub-electrodes and at least one bridge structure, the plurality of second touch-control sub-electrodes are arranged along the first direction, and each of the at least one bridge structure is between two second touch-control sub-electrodes which are adjacent to each other in the first direction, so as to electrically connect the two second touch-control sub-electrodes which are adjacent to each other in the first direction.

For example, in the touch-control electrode structure provided by an embodiment of the present disclosure, each of the plurality of second touch-control sub-electrodes comprises a grid-shaped structure formed by a plurality of metal grids, the grid-shaped structure of each of the plurality of second touch-control sub-electrodes comprises a third grid portion and a plurality of fourth grid portions, the third grid portion is configured to transmit a touch-control signal, and the plurality of fourth grid portions are spaced apart from and insulated from the third grid portion.

For example, the touch-control electrode structure provided by an embodiment of the present disclosure further comprises an insulating layer; and the insulating layer is between the plurality of first touch-control sub-electrodes and the at least one bridge structure and between the plurality of second touch-control sub-electrodes and the at least one bridge structure, each of the at least one bridge structure comprises a conductive structure, and the conductive structure is on a side of the insulating layer away from the plurality of second touch-control sub-electrodes, and is connected with two second touch-control sub-electrodes, which are adjacent to each other in the first direction, through via holes in the insulating layer, respectively.

For example, in the touch-control electrode structure provided by an embodiment of the present disclosure, the plurality of first touch-control sub-electrodes and the plurality of second touch-control sub-electrodes are in an identical layer, and the plurality of first touch-control sub-electrodes are insulated from the plurality of second touch-control sub-electrodes.

For example, in the touch-control electrode structure provided by an embodiment of the present disclosure, the first touch-control electrode is a touch-control driving electrode, and the second touch-control electrode is a touch-control sensing electrode; or the first touch-control electrode is a touch-control sensing electrode, and the second touch-control electrode is a touch-control driving electrode.

At least one embodiment of the present disclosure further provides a display panel, and the display panel comprises the touch-control electrode structure according to any one of the embodiments of the present disclosure, a base substrate, and a display structure; and the display structure and the touch-control electrode structure are stacked on the base substrate.

For example, in the display panel provided by an embodiment of the present disclosure, the display structure comprises a plurality of sub-pixels, and a size of each metal grid in the grid-shaped structure of each of the plurality of first touch-control sub-electrodes is greater than a size of each sub-pixel of the plurality of sub-pixels.

For example, in the display panel provided by an embodiment of the present disclosure, one or more sub-pixels correspond to one metal grid, and an orthographic projection of the one or more sub-pixels on the base substrate is in a region surrounded by an orthographic projection of a corresponding metal grid on the base substrate.

At least one embodiment of the present disclosure further provides an electronic device, and the electronic device comprises the display panel according to any one of the embodiments of the present disclosure.

BRIEF DESCRIPTION OF THE DRAWINGS

In order to clearly illustrate the technical solutions of the embodiments of the present disclosure, the drawings of the embodiments will be briefly described in the following. It is obvious that the described drawings are only related to some embodiments of the present disclosure and thus are not limitative to the present disclosure.

DETAILED DESCRIPTION

Figure 1:
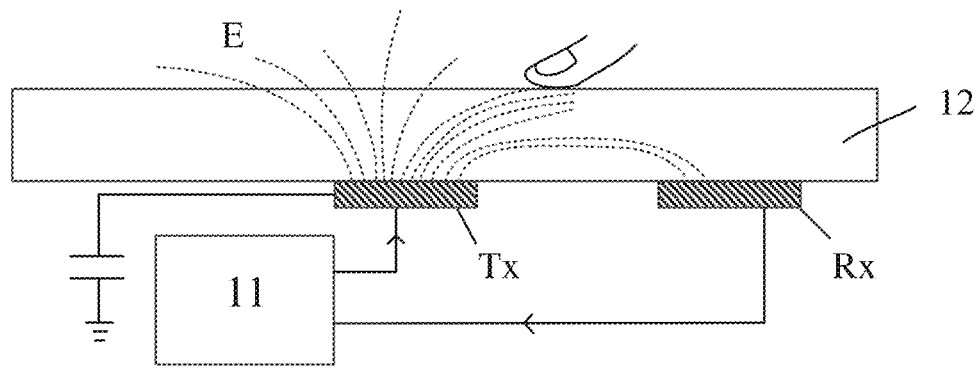
FIG. 1 is a schematic diagram of the working principle of a mutual capacitive touch-control structure.

In order to make objects, technical details and advantages of the embodiments of the present disclosure apparent, the technical solutions of the embodiments of the present disclosure will be described in a clearly and fully understandable way in connection with the drawings related to the embodiments of the present disclosure. Apparently, the described embodiments are just a part but not all of the embodiments of the present disclosure. Based on the described embodiments of the present disclosure herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect," "connected," "coupled," etc., are not intended to define a physical connection or mechanical connection, but may include an electrical connection, directly or indirectly. "On," "under," "right," "left," and the like are only used to indicate relative position relationship, and when the position of the object which is described is changed, the relative position relationship may be changed accordingly.

The drawings in the present disclosure are not drawn strictly according to the actual scale. The number of the first touch-control electrodes in the touch-control electrode structure, the number of the second touch-control electrodes in the touch-control electrode structure, the number of the first touch-control sub-electrodes in the touch-control electrode structure, the number of the second touch-control sub-electrodes in the touch-control electrode structure, the number of metal grids in the touch-control electrode structure, the number of respective grid portions in the touch-control electrode structure, or the like is not limited to the number illustrated in the figure, and the specific size and number of each structure may be determined according to actual needs. The drawings described in the present disclosure are only schematic structural diagrams.

Organic light-emitting diode (OLED) display panels have characteristics such as the self-illumination, high contrast, low energy consumption, wide viewing angle, fast response speed, use for flexible panels, wide using temperature range, simple manufacturing, etc., and have broad development prospects. In order to meet the diversified needs of users, it is of great significance to integrate a variety of functions (such as a touch-control function, a fingerprint recognition function, etc.) in the display panel. For example, forming an on-cell touch-control structure in an OLED display panel is an implementation method, which enables the OLED display panel to achieve the touch-control function by forming the touch-control structure on the encapsulation film of the OLED display panel.

For example, the mutual capacitive touch-control structure includes a plurality of touch-control electrodes, the plurality of touch-control electrodes include a touch-control driving electrode Tx and a touch-control sensing electrode Rx which extend in different directions, and the touch-control driving electrode Tx and the touch-control sensing electrode Rx intersect with each other to form a mutual capacitance for touch-control sensing at the intersection. The touch-control driving electrode Tx is used to input an excitation signal (for example, a touch-control driving signal), and the touch-control sensing electrode Rx is used to output a touch-control sensing signal. By inputting the excitation signal to the touch-control driving electrode, for example, extending in a longitudinal direction, and receiving the touch-control sensing signal from the touch-control sensing electrode, for example, extending in a lateral direction, a detection signal reflecting the capacitance value of the coupling point (such as the intersection point) of the longitudinally-extending electrode and the laterally-extending electrode can be obtained. When the finger touches the touch screen (for example, the cover glass), the coupling between the touch-control driving electrode Tx and the touch-control sensing electrode Rx near the touch point is affected, and thus the capacitance value of the mutual capacitance between the two electrodes at the intersection point is changed, thus resulting in a change of the touch-control sensing signal. According to the data of the two-dimensional capacitance change of the touch screen based on the touch-control sensing signal, the coordinates of the touch point can be calculated.

FIG. 1 is a schematic diagram of the working principle of a mutual capacitive touch-control structure. As illustrated in FIG. 1, under the drive of the touch-control driving circuit 11, the touch-control driving electrode Tx is applied with a touch-control driving signal, thus an electric field line E is generated, and the electric field line E is received by the touch-control sensing electrode Rx to form a reference capacitance. When the finger touches the touch screen 12, because the human body is a conductor, part of the electric field line E generated by the touch-control driving electrode Tx is guided to the finger to form a finger capacitance, which reduces the electric field line E received by the touch-control sensing electrode Rx, and therefore the capacitance value between the touch-control driving electrode Tx and the touch-control sensing electrode Rx decreases. The touch-control driving circuit 11 obtains the above-mentioned capacitance value through the touch-control sensing electrode Rx and compares the capacitance value with the reference capacitance to obtain the capacitance value change. According to the data of the capacitance value change and in conjunction with the position coordinates of each touch-control capacitance, the coordinates of the touch point can be calculated.

In some mutual capacitive touch-control structures, a metal grid-shaped structure may be used to form the touch-control sensing electrode Rx and the touch-control driving electrode Tx, and a plurality of openings are respectively provided in the metal grid-shaped structure of the touch-control sensing electrode Rx and the touch-control driving electrode Tx to reduce the load of the touch-control sensing electrode Rx and the touch-control driving electrode Tx, so as to improve the touch-control performance of the touch-control structure. However, after the touch-control structure is stacked with such as an OLED display panel, the opening pattern in the metal grid-shaped structure usually interferes with the sub-pixel array in the display panel, which may result in difference in the brightness attenuation in different azimuth viewing angles of the display image when the display panel displays in a bright state. Thus, it is easy to lead to such as a dot-shaped, line-shaped or block-shaped dark etch pattern or mura pattern in the display image, that is, lead to poor visual display of the display image, which may cause a serious adverse impact on the display effect of the image. Therefore, the design of the touch-control structure not only needs to consider the electrical performance, but also inevitably needs to design the optical performance.

At least one embodiment of the present disclosure provides a touch-control electrode structure, and the touch-control electrode structure includes a plurality of first touch-control electrodes and a plurality of second touch-control electrodes. The plurality of first touch-control electrodes are arranged along a first direction, and each of the plurality of first touch-control electrodes extends in a second direction; the plurality of second touch-control electrodes are arranged along the second direction, and each of the plurality of second touch-control electrodes extends in the first direction; each of the plurality of first touch-control electrodes includes a plurality of first touch-control sub-electrodes, and the plurality of first touch-control sub-electrodes are arranged along the second direction; each of the plurality of first touch-control sub-electrodes includes a grid-shaped structure formed by a plurality of metal grids; the grid-shaped structure includes a first grid portion and a plurality of second grid portions, the first grid portion is configured to transmit a touch-control signal, and the plurality of second grid portions are spaced apart from and insulated from the first grid portion; and in each of the plurality of first touch-control sub-electrodes, the plurality of second grid portions are periodically arranged along an extending direction of at least one edge of the first touch-control sub-electrode.

In the touch-control electrode structure provided by the above-mentioned embodiment of the present disclosure, the plurality of second grid portions (such as dummy portions), which are isolated from the first grid portion and not used for touch-control signal transmission, are provided in the grid-shaped structure of each first touch-control sub-electrode, and in each first touch-control sub-electrode, the plurality of second grid portions are arranged periodically along the extending direction of one or more edges of the first touch-control sub-electrode. Therefore, in one aspect, the signal transmission load of each first touch-control sub-electrode of the first touch-control electrode can be reduced, and the parasitic capacitance that may be generated in the touch-control electrode structure is alleviated, so that the touch-control sensitivity of the touch-control electrode structure is improved, the electrical performance (for example, touch-control performance) of the touch-control electrode structure is improved, and the reliability of the touch-control electrode structure is further improved. In another aspect, the difference in the brightness attenuation in different azimuth viewing angles which may be caused by the cutting openings used to form the second grid portions in the grid-shaped structure can be reduced, so that the light transmittance of each first touch-control sub-electrode of the first touch-control electrode can be more uniform. Thus, phenomena such as a dot-shaped, line-shaped or block-shaped dark etch pattern or mura pattern that may occur in the display image of the display panel using the touch-control electrode structure provided by the above-mentioned embodiment of the present disclosure may be alleviated or avoided, and the poor visual display that may occur in the display image is alleviated or avoided, so that the display effect of the image is improved. Thus, the touch-control electrode structure provided by the above-mentioned embodiment of the present disclosure can achieve synchronous optimization of the electrical performance and optical performance.

In the following, the embodiments of the present disclosure will be described in detail with reference to the accompanying drawings. It should be noted that the same reference numerals in different drawings are used to refer to the same described elements.

Figure 2:
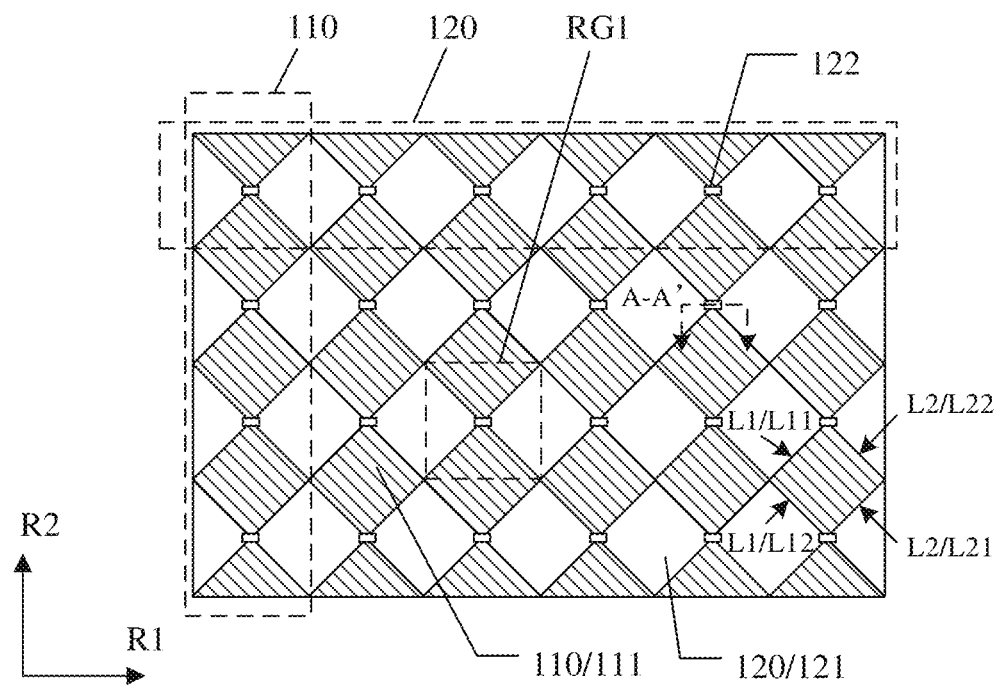
FIG. 2 is a schematic planar diagram of a touch-control electrode structure provided by some embodiments of the present disclosure.

FIG. 2 is a schematic planar diagram of a touch-control electrode structure provided by some embodiments of the present disclosure. As illustrated in FIG. 2, the touch-control electrode structure includes a plurality of first touch-control electrodes 110 and a plurality of second touch-control electrodes 120. The plurality of first touch-control electrodes 110 are arranged along the first direction R1, and each first touch-control electrode 110 extends in the second direction R2; the plurality of second touch-control electrodes 120 are arranged along the second direction R2, and each second touch-control electrode 120 extends in the first direction R1. Each first touch-control electrode 110 includes a plurality of first touch-control sub-electrodes 111, and the plurality of first touch-control sub-electrodes 111 are arranged along the second direction R2.

Figure 3A:
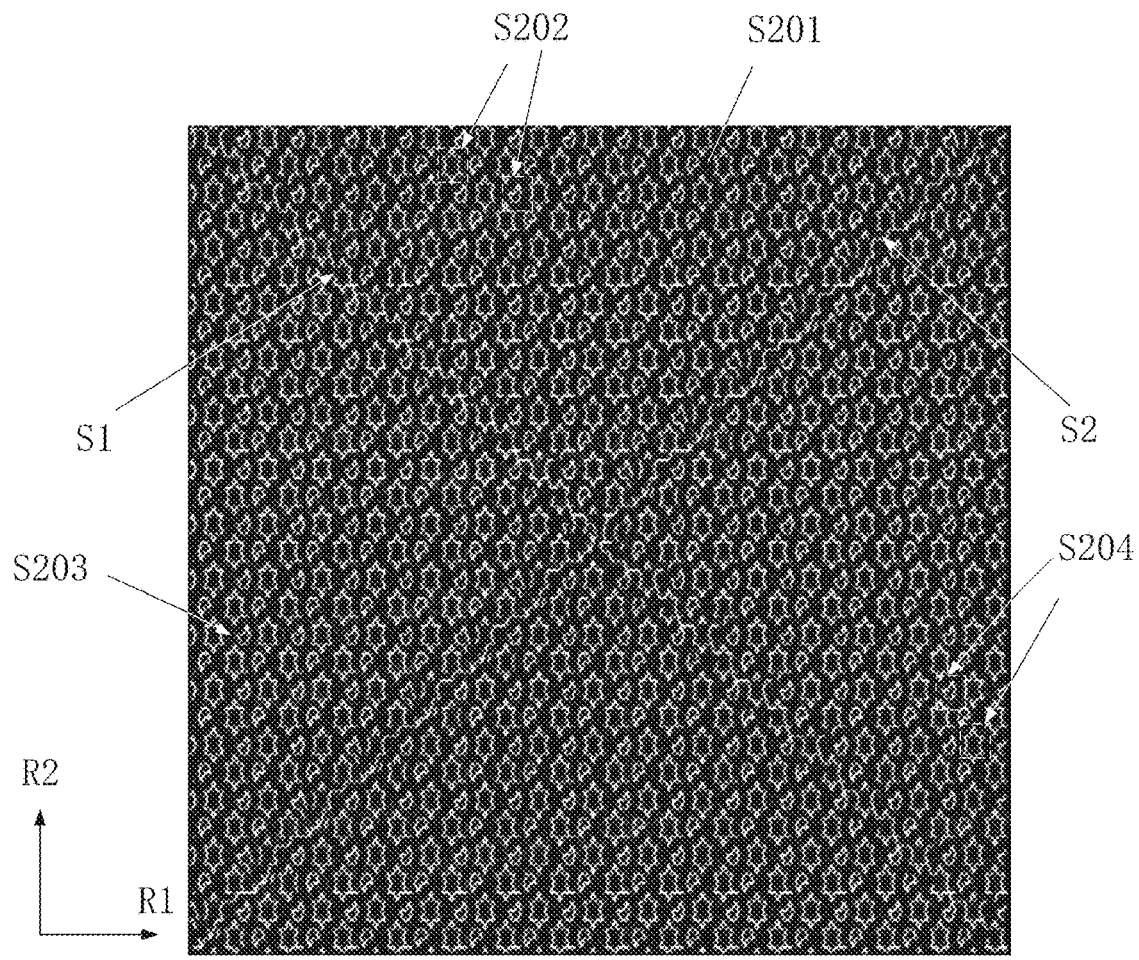
FIG. 3A is a schematic diagram of a region occupied by each grid portion in a region RG1 illustrated in FIG. 2.
Figure 4A:
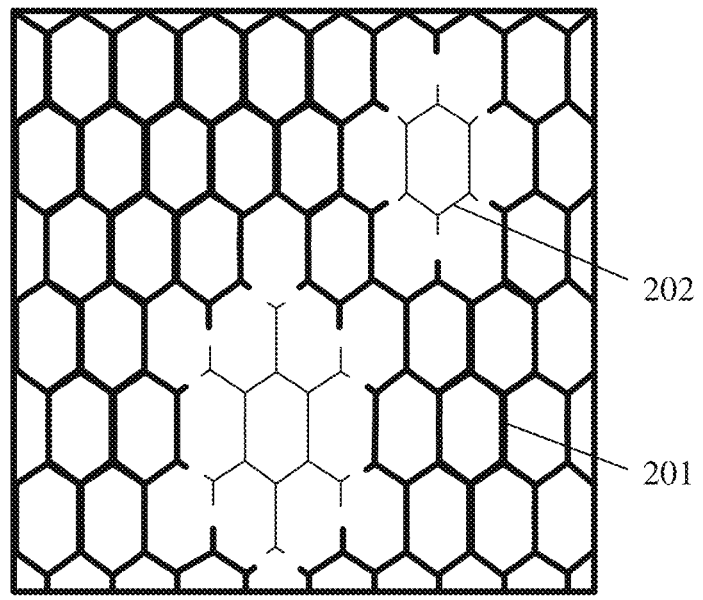
FIG. 4A is a schematic diagram of part of a grid-shaped structure in a first touch-control sub-electrode provided by some embodiments of the present disclosure.

FIG. 3A is a schematic diagram of a region occupied by each grid portion in a region RG1 illustrated in FIG. 2, and FIG. 4A is a schematic diagram of part of a grid-shaped structure in a first touch-control sub-electrode provided by some embodiments of the present disclosure. It should be noted that, compared with FIG. 4A, in order to clearly show the region occupied by the first grid portion and the second grid portion in the first touch-control sub-electrode (and the region occupied by the third grid portion and the fourth grid portion in the second touch-control sub-electrode), FIG. 3A does not show the metal grid in the grid-shaped structure of the first touch-control sub-electrode (and the second touch-control sub-electrode), that is, FIG. 3A is only used to show characteristics such as a size, an outline or the like of the region occupied by the first grid portion and the second grid portion in the first touch-control sub-electrode (and the region occupied by the third grid portion and the fourth grid portion in the second touch-control sub-electrode).

For example, the region S202 occupied by the second grid portion in the first touch-control sub-electrode illustrated in FIG. 3A is a region determined based on the cutting opening for cutting to form the second grid portion, and the region S201 occupied by the first grid portion in the first touch-control sub-electrode is a region, except for the region S202 occupied by the second grid portion, in the first touch-control sub-electrode. The region S204 occupied by the fourth grid portion in the second touch-control sub-electrode is a region determined based on the cutting opening for cutting to form the fourth grid portion, and the region S203 occupied by the third grid portion in the second touch-control sub-electrode is a region, except for the region S204 occupied by the fourth grid portion, in the second touch-control sub-electrode. For example, the broken lines S1 and S2 illustrated in FIG. 3A may be used to correspondingly represent dividing lines for forming the edge of the first touch-control sub-electrode (for example, the first edge L1 and the second edge L2 of the first touch-control sub-electrode 111 illustrated in FIG. 2) or the edge of the second touch-control sub-electrode.

For example, as illustrated in FIG. 2, FIG. 3A and FIG. 4A, each first touch-control sub-electrode 111 includes a grid-shaped structure formed by a plurality of metal grids, the grid-shaped structure includes a first grid portion 201 and a plurality of second grid portions 202, the first grid portion 201 is configured to transmit a touch-control signal, and the plurality of second grid portions 202 are spaced apart from and insulated from the first grid portion 201. For example, in each first touch-control sub-electrode 111, the second grid portion 202 is a dummy portion isolated from the first grid portion 201 and not used for touch-control signal transmission, for example, the second grid portion 202 may be in a floating state, that is, the second grid portion 202 is not electrically connected with other structures or does not receive any electrical signal. Therefore, the electrode area (for example, the effective area for transmitting the touch-control signal) of the first touch-control sub-electrode 111 can be reduced by providing the second grid portions 202 spaced apart from and insulated from the first grid portion 201 in the grid-shaped structure of each first touch-control sub-electrode 111 (that is, the second grid portions 202 are not electrically connected with the first grid portion 201), and the capacitance load (self-capacitance) on the first touch-control sub-electrode 111 is reduced, so that the signal transmission load on the first touch-control electrode 110 is reduced and the touch-control sensitivity is improved.

It should be noted that, the pattern of the second grid portion 202 illustrated in FIG. 4A (for example, the outline, the number, the size or the like of the metal grid included) is only an exemplary description. For example, in some embodiments, the pattern of the second grid portion 202 illustrated in FIG. 4B may also be formed in the grid-shaped structure. The embodiments of the present disclosure do not limit the specific pattern features, such as the shape, outline, size, etc., of the second grid portion 202 formed in the grid-shaped structure.

Figure 4B:
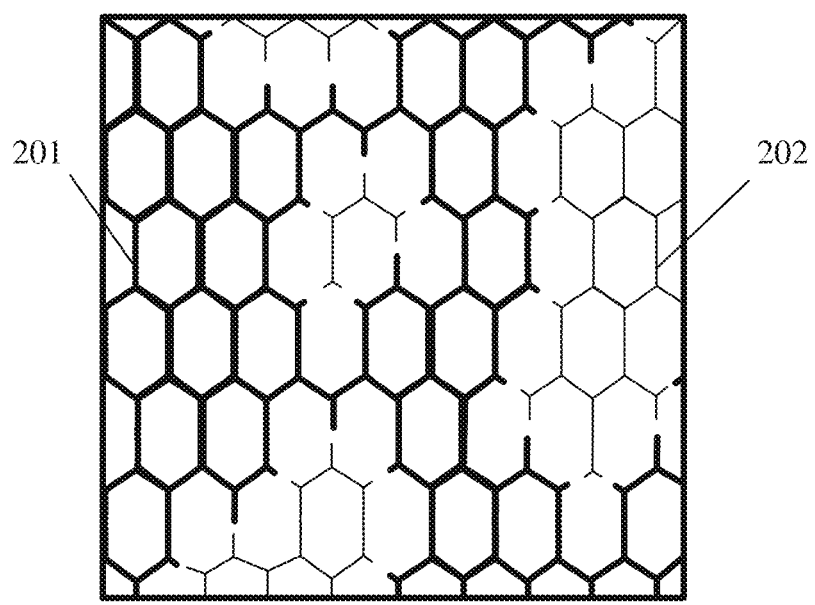
FIG. 4B is a schematic diagram of part of a grid-shaped structure in another first touch-control sub-electrode provided by some embodiments of the present disclosure.

For example, the metal grids in the grid-shaped structure illustrated in FIG. 4A and FIG. 4B are in polygon shapes, such as hexagon shapes. In some other embodiments of the present disclosure, shapes of the metal grids may also be in other polygon shapes, such as triangle shapes, quadrilateral shapes, pentagon shapes, etc., which can be designed according to actual needs. The embodiments of the present disclosure do not limit the specific shapes, sizes, or the like of the metal grids.

As illustrated in FIG. 2, FIG. 3A and FIG. 4A, each first touch-control sub-electrode 111 includes a first edge L1 and a second edge L2 which are opposite to each other in the first direction R1 to form the first touch-control sub-electrode 111. In each first touch-control sub-electrode 111, the plurality of second grid portions 202 are periodically arranged along the extending direction of the first edge L1 and the extending direction of the second edge L2 of the first touch-control sub-electrode 111. For example, taking the first touch-control sub-electrode 111 with a diamond outline illustrated in FIG. 2 as an example, the first edge L1 and the second edge L2 are edges respectively in shapes of "<" and ">" which are opposite in the first direction R1, and the plurality of second grid portions 202 insulated from the first grid portion 201 are periodically arranged along the extending direction "<" of the first edge L1 and the extending direction ">" of the second edge L2 of the first touch-control sub-electrode 111 with the diamond outline as a whole, for example, the plurality of second grid portions 202 may be periodically arranged along extending directions of four edges of the diamond. Thus, by allowing the plurality of second grid portions 202 in each first touch-control sub-electrode 111 to be periodically arranged along the extending direction (for example, the extending direction "<") of the first edge L1 of the first touch-control sub-electrode 111 and the extending direction (for example, the extending direction ">") of the second edge L2 of the first touch-control sub-electrode 111, the brightness attenuation difference in different azimuth viewing angles that may be caused by the plurality of cutting openings used to form the second grid portions 202 in the grid-shaped structure can be reduced, and the light transmittance of the first touch-control sub-electrode 111 is more uniform, so that the optical performance of the touch-control electrode structure is improved, phenomena such as the dot-shaped, line-shaped or block-shaped dark etch pattern or mura pattern that may occur in the display image are alleviated or avoided, the poor visual display that may occur in the display image is alleviated or avoided, and the display effect of the image is improved.

Figure 3B:
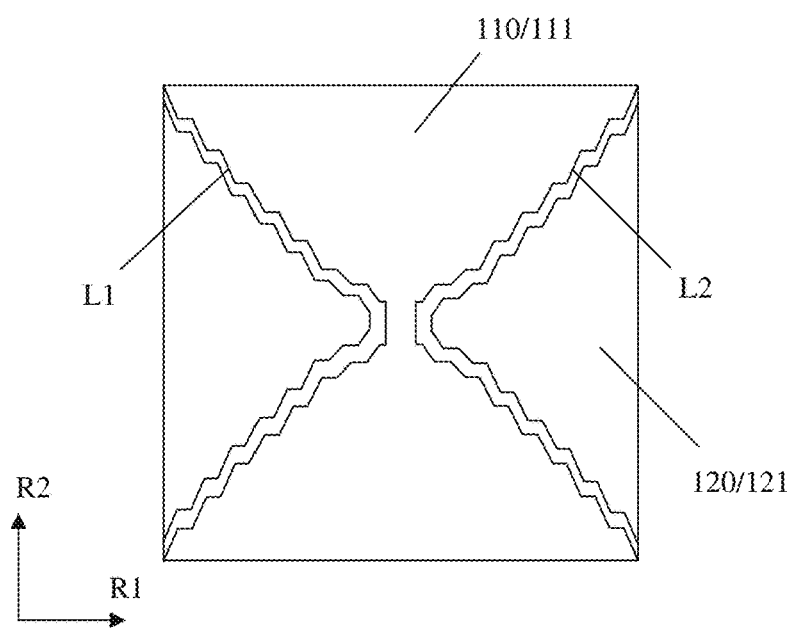
FIG. 3B is a schematic diagram of an edge portion of a first touch-control sub-electrode and a second touch-control sub-electrode in the region RG1 illustrated in FIG. 2.

It should be noted that the extending direction of the first edge L1 and the extending direction of the second edge L2 of the first touch-control sub-electrode 111 respectively refer to extending directions of the overall shapes of the first edge L1 and the second edge L2. For example, the first edge L1 and the second edge L2 may extend respectively in a straight line shape, a broken line shape, a sawtooth shape, or other suitable shapes, that is, the embodiments of the present disclosure do not limit the specific shapes of the first edge L1 and the second edge L2. For example, taking the example illustrated in FIG. 3A as an example, FIG. 3B shows a schematic diagram of shapes corresponding to the first edge L1 and the second edge L2 of the first touch-control sub-electrode 111 in FIG. 3A. As illustrated in FIG. 3B, the first edge L1 and the second edge L2 of the first touch-control sub-electrode 111 may respectively extend such as in a broken line shape. It should be noted that, in some other examples, the first edge L1 and the second edge L2 of the first touch-control sub-electrode 111 may also include a sawtooth shape, a triangle shape, or other suitable shapes, which are not limited by the embodiments of the present disclosure.

It should be noted that, in the above-mentioned embodiments, the main body outline of each first touch-control sub-electrode 111 is diamond; and in other embodiments of the present disclosure, the first touch-control sub-electrode 111 may also adopt other regular or irregular shapes, such as the triangle, rectangle, hexagon, octagon, strip, etc., which are not limited by the embodiments of the present disclosure.

Therefore, in the touch-control electrode structure provided by the above-mentioned embodiments of the present disclosure, by providing the plurality of second grid portions 202 isolated from the first grid portion 201 and not used for touch-control signal transmission in the grid-shaped structure, and allowing the plurality of second grid portions 202 to be periodically arranged in each first touch-control sub-electrode 111 along the extending direction (for example, the extending direction "<") of the first edge L1 of the first touch-control sub-electrode 111 and the extending direction (for example, the extending direction ">") of the second edge L2 of the first touch-control sub-electrode 111, in one aspect, the signal transmission load on each first touch-control sub-electrode 111 of the first touch-control electrode 110 is reduced, and the parasitic capacitance that may be generated in the touch-control electrode structure is alleviated, so that the touch-control sensitivity of the touch-control electrode structure is improved, and the electrical performance (for example, touch-control performance) of the touch-control electrode structure is improved; and in another aspect, the light transmittance of each first touch-control sub-electrode 111 of the first touch-control electrode 110 is more uniform, so that the optical performance of the touch-control electrode structure is improved, and a better display effect is achieved, thereby achieving the synchronous optimization of the electrical performance and optical performance of the touch-control electrode structure.

For example, as illustrated in FIG. 2, each second touch-control electrode 120 includes a plurality of second touch-control sub-electrodes 121, and the plurality of second touch-control sub-electrodes 121 are arranged along the first direction R1.

For example, the average side length of the region RG1 illustrated in FIG. 2 may be referred to as an interval or a pitch of the touch-control electrode structure. Because the diameter of the touch area when the human finger contacts such as a display panel or an electronic device to which the touch-control electrode structure is applied is about 4 mm, the size of the pitch P may range from 3 mm to 5 mm, such as about 3.5 mm, 3.7 mm, 4 mm, 4.5 mm, or the like. For example, the value of the pitch P is the same as the average side length of each first touch-control sub-electrode 111 and the average side length of each second touch-control sub-electrode 121, and is also the same as the center distance between adjacent first touch-control sub-electrodes 111 and the center distance between adjacent second touch-control sub-electrodes 121.

For example, as illustrated in FIG. 2 and FIG. 3A, in some embodiments of the present disclosure, each second touch-control sub-electrode 121 includes a grid-shaped structure formed by a plurality of metal grids, the grid-shaped structure includes a third grid portion 203 and a plurality of fourth grid portions 204, the third grid portion 203 is configured to transmit a touch-control signal, and the plurality of fourth grid portions 204 are spaced apart from and insulated from the third grid portion 203. For example, in each second touch-control sub-electrode 121, the fourth grid portion 204 is a dummy portion isolated from the third grid portion 203 and not used for touch-control signal transmission. For example, the fourth grid portion 204 may be in a floating state, that is, the fourth grid portion 204 is not electrically connected with other structures or does not receive any electrical signal (for example, referring to the arrangement of the first grid portion 201 and the second grid portion 202 illustrated in FIG. 4A). Therefore, the electrode area (for example, the effective area for transmitting the touch-control signal) of the second touch-control sub-electrode 121 can be reduced by providing the fourth grid portions 204 spaced apart from and insulated from the third grid portion 203 (that is, the fourth grid portions 204 are not electrically connected with the third grid portion 203), and the capacitance load (self-capacitance) on the second touch-control sub-electrode 121 is reduced, so that the signal transmission load on the second touch-control electrode 120 is reduced and the touch-control sensitivity is improved.

For example, in some embodiments of the present disclosure, the plurality of fourth grid portions 204 may be periodically arranged along extending directions of edges, which are opposite in the first direction R1 or the second direction R2, of the second touch-control sub-electrode 121. For example, taking the second touch-control sub-electrode 121 with a diamond outline illustrated in FIG. 2 as an example, the plurality of fourth grid portions 204 may be periodically arranged along extending directions of four sides of the diamond. Thus, the brightness attenuation difference in different azimuth viewing angles that may be caused by the plurality of cutting openings used to form the fourth grid portions 204 in the grid-shaped structure can be reduced, and the light transmittance of the second touch-control sub-electrode 121 can be more uniform, so that the second touch-control sub-electrode 121 and the first touch-control sub-electrode 111 cooperate with each other to further improve the optical performance of the touch-control electrode structure.

For example, the third grid portion 203 and the fourth grid portion 204 in the grid-shaped structure of the second touch-control sub-electrode 121 may be arranged in a similar or the same manner as the first grid portion 201 and the second grid portion 202 in the grid-shaped structure of the first touch-control sub-electrode 111. In the following, the embodiments of the present disclosure will specifically describe the first grid portion 201 and the second grid portion 202 in the grid-shaped structure of the first touch-control sub-electrode 111 with reference to the accompanying drawings. The contents of the third grid portion 203 and the fourth grid portion 204 in the grid-shaped structure of the second touch-control sub-electrode 121 may refer to the description of the first grid portion 201 and the second grid portion 202 in the grid-shaped structure of the first touch-control sub-electrode 111 below, and details will not be repeated.

For example, in some embodiments, as illustrated in FIG. 3A, the plurality of second grid portions 202 are arranged at equal intervals in the extending direction of the first edge L1 and the extending direction of the second edge L2 of the first touch-control sub-electrode 111. For example, a plurality of (for example, two, three, four, or the like) second grid portions 202 adjacent in the extending direction of the first edge L1 or the extending direction of the second edge L2 may be taken as a group, and the same distance may be maintained between each group of second grid portions 202 adjacent in the extending direction of the first edge L1 or the extending direction of the second edge L2. Alternatively, the same distance may be maintained between each two adjacent second grid portions 202 in the extending direction of the first edge L1 or the extending direction of the second edge L2. Thus, the plurality of cutting openings used to form the second grid portions 202 in the grid-shaped structure can be in a relatively uniform arrangement in each first touch-control sub-electrode 111, so as to further improve the uniformity and consistency of the light transmittance of each first touch-control sub-electrode 111 of the first touch-control electrode 110, and better reduce or avoid the brightness attenuation difference in different azimuth viewing angles.

For example, at least part of the pattern formed by each second grid portion 202 may be at least partially the same as the shape of the first edge L1 or the second edge L2 of the first touch-control sub-electrode 111. For example, the pattern formed by a part of the second grid portion 202 may be exactly the same as the shape of the first edge L1 or the second edge L2 of the first touch-control sub-electrode 111, and the pattern formed by another part of the second grid portion 202 may be partially the same as the shape of the first edge L1 or the second edge L2 of the first touch-control sub-electrode 111. Alternatively, in some other embodiments of the present disclosure, the pattern formed by each second grid portion 202 may be exactly the same as the shape of the first edge L1 or the second edge L2 of the first touch-control sub-electrode 111, or the pattern formed by each second grid portion 202 may be partially the same as the shape of the first edge L1 or the second edge L2 of the first touch-control sub-electrode 111, and the embodiments of the present disclosure are not limited in this aspect. Therefore, the uniformity and consistency of the light transmittance near the first edge L1 and the second edge L2 in the first touch-control sub-electrode 111 can be improved, and the brightness attenuation difference in different azimuth viewing angles near the first edge L1 and the second edge L2 of the first touch-control sub-electrode 111 can be alleviated or avoided, so that the optical performance is further optimized.

For example, the minimum value of the distance from each second grid portion 202 to the first edge L1 and the second edge L2 of the first touch-control sub-electrode 111 is approximate or equal to the minimum value of the distance between different second grid portions 202. For example, the minimum value of the distance between the second grid portion 202 and the first edge L1 or the second edge L2 of the first touch-control sub-electrode 111 can be understood as the minimum value of the distance between the edge of the region S202 occupied by the second grid portion 202 in the first touch-control sub-electrode 111 and the first edge L1 or the second edge L2 illustrated in FIG. 3A, and the minimum value of the distance between different second grid portions 202 can be understood as the minimum value of the distance between edges of the regions S202 occupied by different second grid portions 202 in the first touch-control sub-electrode 111 illustrated in FIG. 3A. Thus, the uniformity of the arrangement of the plurality of second grid portions 202 in the grid-shaped structure can be further improved, so that the uniformity of the distribution of the plurality of cutting openings used to form the second grid portions 202 in the grid-shaped structure of the first touch-control sub-electrode 111 can be improved, and the uniformity of the light transmittance of the first touch-control sub-electrode 111 can be further improved.

For example, in consideration of human eye sensitivity and other factors, the distance between adjacent second grid portions 202 may be less than or equal to 1.5 mm, and further, for example, may be less than or equal to 0.3 mm, so as to optimize the optical performance.

For example, in some embodiments, a ratio of the plurality of second grid portions 202 in the grid-shaped structure of each first touch-control sub-electrode 111 ranges from 10% to 25%. Thus, by adjusting the ratio of the second grid portions 202 not used for touch-control signal transmission in the grid-shaped structure of each first touch-control sub-electrode 111, the electrode area (for example, the effective area for transmitting the touch-control signal) of the first touch-control sub-electrode 111 can be reduced, the capacitance load on the first touch-control sub-electrode 111 can be reduced, and the non-uniformity of the light transmittance of the first touch-control sub-electrode 111 caused by, for example, the formation of too many second grid portions 202 through the cutting openings in the grid-shaped structure can further be avoided, so that the synchronous optimization of the electrical performance and optical performance of the touch-control electrode structure can be achieved.

It should be noted that the ratio of the second grid portions 202 in the grid-shaped structure of the first touch-control sub-electrode 111 may refer to the ratio of the metal grids constituting the second grid portions 202 in all the metal grids constituting the whole grid-shaped structure (for example, including the first grid portion 201 and the second grid portions 202) of the first touch-control sub-electrode 111. Alternatively, it may also refer to an area ratio of all regions occupied by the second grid portions 202 in the first touch-control sub-electrode 111 (for example, the sum of all the regions S202 illustrated in FIG. 3A in the first touch-control sub-electrode 111) to a region occupied by the grid-shaped structure of the first touch-control sub-electrode 111 in the first touch-control sub-electrode 111 as a whole. For example, when the first touch-control sub-electrode 111 is composed of metal grids, it refers to a ratio of an area of all the regions occupied by the second grid portions 202 in the first touch-control sub-electrode 111 to a size area of the first touch-control sub-electrode 111.

For example, in some examples, the ratio of the second grid portion 202 included in the grid-shaped structure of each first touch-control sub-electrode 111 may be about 20%. Similarly, the ratio of the fourth grid portion 204 included in the grid-shaped structure of each second touch-control sub-electrode 121 may also be about 20%. In this way, the touch-control sensitivity between the first touch-control electrode 110 and the second touch-control electrode 120 in the touch-control electrode structure may reach about 5.21%, which can not only improve the optical performance of the touch-control electrode structure, but also optimize the touch control effect.

For example, in some embodiments of the present disclosure, the size of the region occupied by each second grid portion 202 (for example, the region S202 illustrated in FIG. 3A) in the first direction R1 or the second direction R2 is less than or equal to 0.2 mm, for example, it may be approximately 0.05 mm. 0.1 mm, 0.12 mm, 0.15 mm, 0.18 mm, 0.2 mm, etc. Therefore, the normal transmission of the touch-control signal through the first grid portion 201 in the grid-shaped structure of the first touch-control sub-electrode 111 can be ensured, and the non-uniformity of the light transmittance of the first touch-control sub-electrode 111 can also be avoided, for example, when the corresponding second grid portion 202 needs to be formed through a relatively large or long cutting opening in the grid-shaped structure, so that the synchronous optimization of the electrical performance and optical performance can be achieved.

In some embodiments of the present disclosure, while reducing the signal transmission load on the first touch-control sub-electrode 111 to improve the electrical performance, in order to further improve the uniformity of light transmittance in the first touch-control sub-electrode 111, the first touch-control sub-electrode 111 may be divided into a plurality of region units, and a ratio of the second grid portion 202 in each region unit in the grid-shaped structure, in the region unit can be kept the same or similar as much as possible, or the pattern formed by the second grid portion 202 in each region unit can be further kept similar or consistent with each other as much as possible. Therefore, not only the consistency of the signal transmission capacity on the first touch-control sub-electrode 111 can be improved and the electrical performance can be optimized, but also the uniformity and consistency of the light transmittance of the first touch-control sub-electrode 111 can be further improved, so that the brightness attenuation difference in different azimuth viewing angles can be alleviated or avoided to achieve the synchronous optimization of optical performance.

Figure 5A:
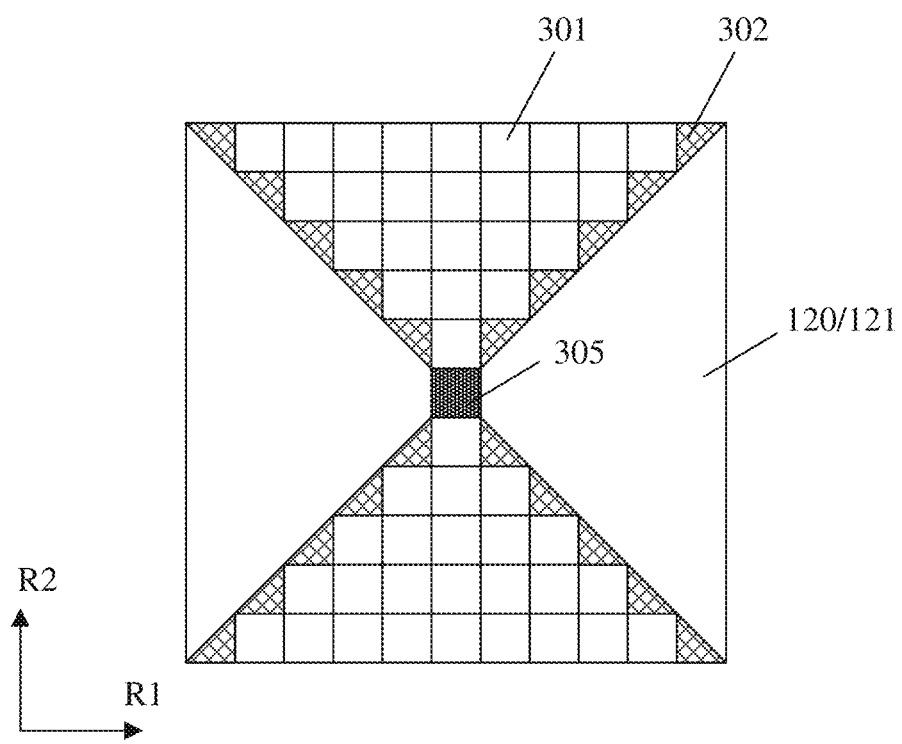
FIG. 5A to FIG. 5C are schematic diagrams of region unit dividing in a first touch-control sub-electrode and a second touch-control sub-electrode in the region RG1 illustrated in FIG. 2.
Figure 5B:
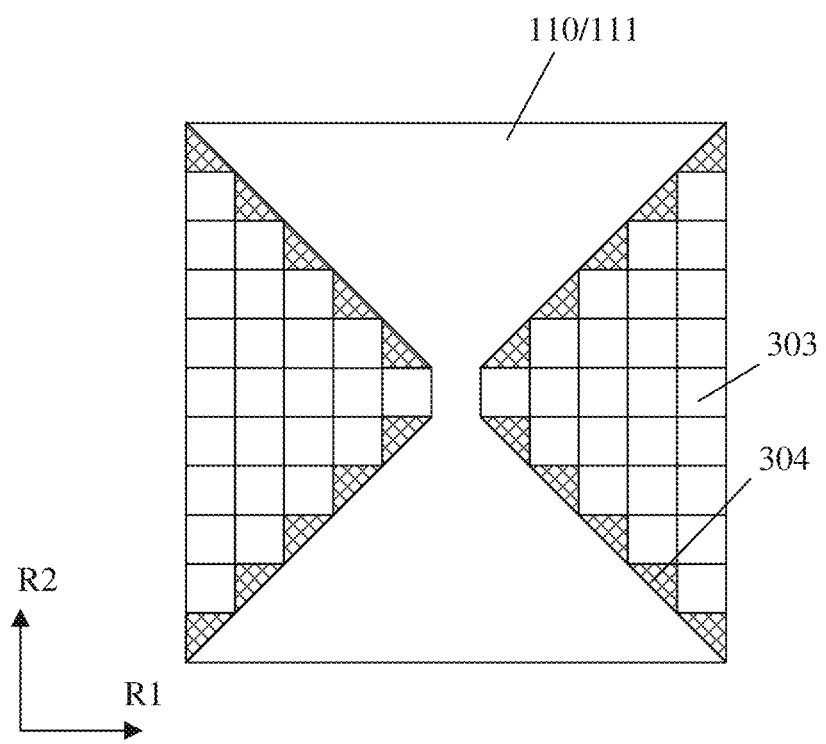
Figure 5C:
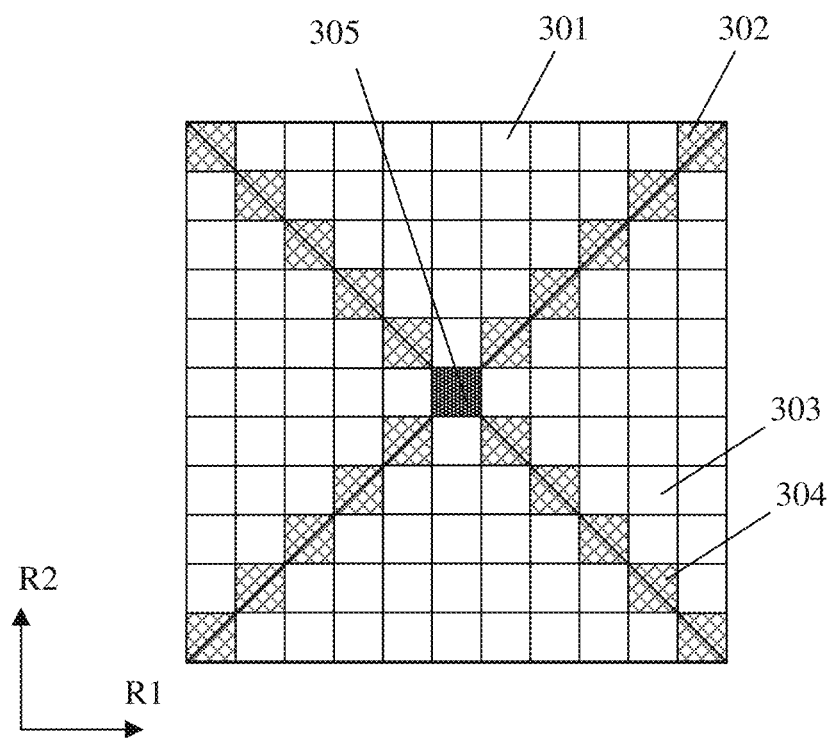

FIG. 5A to FIG. 5C are schematic diagrams of region unit dividing in the first touch-control sub-electrode 111 and the second touch-control sub-electrode 121 in the region RG1 illustrated in FIG. 2. For example, in order to clearly show the division of region units in part of the first touch-control sub-electrode 111 and part of the second touch-control sub-electrode 121 in the region RG1, FIG. 5A shows only the region unit division of the first touch-control sub-electrode 111 in the region RG1, FIG. 5B shows only the region unit division of the second touch-control sub-electrode 121 in the region RG1, and FIG. 5C shows the overall division of the region units in the first touch-control sub-electrode 111 and the second touch-control sub-electrode 121 in the region RG1.

For example, as illustrated in FIG. 5A, the first touch-control sub-electrode 111 includes a plurality of first region units 301. For example, FIG. 4A or FIG. 4B may be a schematic diagram corresponding to one first region unit 301 illustrated in FIG. 5A. For example, the first grid portion 201 and the plurality of second grid portions 202 are located in the plurality of first region units 301, and each first region unit 301 of the plurality of first region units 301 includes at least one second grid portion 202. For example, taking the first region unit 301 illustrated in FIG. 4A as an example, each first region unit 301 illustrated in FIG. 4A includes two second grid portions 202. Alternatively, taking the first region unit 301 illustrated in FIG. 4B as an example, each first region unit 301 illustrated in FIG. 4B includes four second grid portions 202. The area ratio of the region, occupied by the at least one second grid portion 202 in each first region unit 301, in the first region unit 301 is identical and is a first area ratio. Thus, by keeping the ratio of the second grid portion 202 included in each first region unit 301 of the first touch-control sub-electrode 111 (for example, the area ratio of the region, occupied by all the second grid portions 202 included in the first region unit 301, in the first region unit 301) the same, it can not only improve the stability and consistency of the touch-control signal transmission in each first touch-control sub-electrode 111 to improve the electrical performance, but also improve the uniformity of the distribution of the cutting openings used to form the second grid portions 202 in the first touch-control sub-electrode 111 to allow the light transmittance of the first touch-control sub-electrode 111 to be more uniform, so as to improve the optical performance.

It should be noted that in the case that the area ratio of the region, occupied by the second grid portion 202 of the first region unit 301, in each first region unit 301 is the same, for example, the shape, the size or the like of each second grid portion 202 formed in each first region unit 301 may be the same as or different from the shape, the size or the like of the overall pattern formed by the plurality of second grid portions 202 in the first region unit 301. For example, the number of cutting openings for forming the second grid portions 202 in each first region unit 301 may be the same as or different from each other. That is, in the above-mentioned embodiment, in the case that the area ratio of the region occupied by the second grid portion 202 in each first region unit 301 meets the effect of the above-mentioned first area ratio, the shape, the size and the pattern of the second grid portion 202 in each first region unit 301, the number, the position or the like of cutting openings used to form the second grid portion 202, etc. are not limited.

It should be noted that the above-mentioned first area ratio refers to the ratio of the total area of the regions occupied by all the second grid portions 202 included in each first region unit 301 to the total area of the first region unit 301. For example, the first area ratio may range from 10% to 25%, for example, it may further range from 15% to 20%, so as to better realize the synchronous optimization of the electrical performance and optical performance.

For example, the ratio of the size of the first region unit 301 to the size of the first touch-control sub-electrode 111 may range from 5% to 25%, so that in the case that each first touch-control sub-electrode 111 is divided into a plurality of first region units 301 according to the above-mentioned ratio range, the uniformity and consistency of the distribution of the second grid portions 202 in the grid-shaped structure of the first touch-control sub-electrode 111 can be significantly improved, so as to better realize the synchronous optimization of the electrical performance and optical performance.

For example, the size of the first region unit 301 may range from 0.2 mm to 1 mm, further for example, from 0.2 mm to 0.5 mm, or further for example, the size of the first region unit 301 does not exceed 0.3 mm, such as 0.2 mm, 0.3 mm, or the like.

It should be noted that, in the embodiments illustrated in FIG. 5A to FIG. 5C, the first region unit 301 is in a square shape. In some other embodiments of the present disclosure, the first region unit 301 may also be represented by other different shapes, such as a triangle shape, a diamond shape, a pentagon shape, a hexagon shape, or other regular or irregular shapes, which are not limited by the embodiments of the present disclosure.

In some embodiments of the present disclosure, the grid-shaped structure of the first touch-control sub-electrode 111 includes a plurality of cutting openings to form the first grid portion 201 and the plurality of second grid portions 202. For example, the number of cutting openings in each of the first region units 301 may be the same as each other, so that the uniformity and consistency of the light transmittance of the first touch-control sub-electrode 111 can be further improved, the brightness attenuation difference in different azimuth viewing angles can be reduced or avoided, and the optimization of optical performance can be realized. For example, taking the first region unit 301 illustrated in FIG.

4A as an example, 18 cutting openings are included in the first region unit 301, so that two second grid portions 202 can be formed in the grid-shaped structure in the first region unit 301.

For example, in some embodiments of the present disclosure, the pattern formed by the above-mentioned at least one second grid portion 202 in each first region unit 301 of the plurality of first region units 301 is at least partially the same as each other, that is, the pattern contained in the grid-shaped structure in each first region unit 301 may be partially the same as each other or completely the same as each other. For example, each first region unit 301 may include one second grid portion 202, and pattern features such as the shape, size, etc. of the one second grid portion 202 are partially or completely the same as each other. Alternatively, each first region unit 301 may include the same number of second grid portions 202, and the pattern formed by the plurality of second grid portions 202 as a whole is the same as each other, for example, the pattern features such as the shape, size, or the like are partially or completely the same as each other. For example, each first region unit 301 of the first touch-control sub-electrode 111 may be as illustrated in FIG. 4A or FIG. 4B. Thus, by allowing the pattern formed by the second grid portion 202 in each first region unit 301 to be consistent with each other as much as possible, it can not only ensure the consistency of the signal transmission capacity on the first touch-control sub-electrode 111 to optimize the electrical performance, but also significantly improve the uniformity and consistency of the light transmittance of the first touch-control sub-electrode 111 to reduce or avoid the brightness attenuation difference in different azimuth viewing angles, so as to realize the optimization of optical performance.

For example, the extending direction of the pattern formed by all the second grid portions 202 in each first region unit 301 on the whole may be respectively parallel to the extending direction of each edge of the first touch-control sub-electrode 111. Alternatively, the formed pattern on the whole may further be the same as the shape of the edge of the first touch-control sub-electrode 111, for example, the formed pattern on the whole may be the same as the broken line pattern of the first edge L1 and the second edge L2 illustrated in FIG. 3B, so as to reduce or avoid the brightness attenuation difference in different azimuth viewing angles near the edge of the first touch-control sub-electrode 111 and optimize the optical performance.

For example, as illustrated in FIG. 2, the first edge L1 of the first touch-control sub-electrode 111 includes a first sub-edge L11 and a second sub-edge L12 which are connected to each other, the second edge L2 of the first touch-control sub-electrode 111 includes a third sub-edge L21 and a fourth sub-edge L22 which are connected to each other, the first sub-edge L11 is parallel to the third sub-edge L21, the second sub-edge L12 is parallel to the fourth sub-edge L22, and an included angle between the first sub-edge L11 and the fourth sub-edge L22 is equal to an included angle between the second sub-edge L12 and the third sub-edge L21. The extending direction of the pattern formed by one or more second grid portions 202 in each first region unit 301 is parallel to the extending direction of the first sub-edge L11 and the third sub-edge L21, or parallel to the extending direction of the second sub-edge L12 and the fourth sub-edge L22.

For example, in some examples, part or all of the pattern formed by one or more second grid portions 202 in each first region unit 301 is at least partially the same as the shape of the first sub-edge L11 and the third sub-edge L21, for example, it may be partially the same or completely the same. Alternatively, part or all of the pattern formed by one or more second grid portions 202 in each first region unit 301 is at least partially the same as the shape of the second sub-edge L12 and the fourth sub-edge L22, for example, it may be partially the same or completely the same. Therefore, the brightness attenuation difference in different azimuth viewing angles near each sub-edge of the first touch-control sub-electrode 111 can be reduced or avoided, and the optical performance can be optimized.

For example, the first sub-edge L11, the second sub-edge L12, the third sub-edge L21, and the fourth sub-edge L22 of the first touch-control sub-electrode 111 may extend in a broken line shape, respectively. For example, the broken line shape may include a zigzag shape, a triangle shape, or other suitable shapes, and the embodiments of the present disclosure are not limited in this aspect.

For example, as illustrated in FIG. 5A and FIG. 5C, the first touch-control sub-electrode 111 further includes a plurality of second region units 302, and the plurality of second region units 302 are arranged around the plurality of first region units 301 to serve as an edge portion of the first touch-control sub-electrode 111, for example, to form the first edge L1 and the second edge L2 of the first touch-control sub-electrode 111. The first grid portion 201 and the plurality of second grid portions 202 are further located in the plurality of second region units 302, and each second region unit 302 of the plurality of second region units 302 includes one or more second grid portions 202. The area ratio of the region, occupied by one or more second grid portions 202 of each second region unit 302 of the plurality of second region units 302, in the second region unit 302 is the same as each other and is a second area ratio. Thus, by allowing the area ratio of the second grid portion 202 included in each second region unit 302 of the first touch-control sub-electrode 111 to keep the same, the stability and consistency of touch-control signal transmission in the first touch-control sub-electrode 111 can be further improved, so as to improve the electrical performance, and moreover, the uniformity of the distribution of the cutting openings for forming the second grid portion 202 near the edge of the first touch-control sub-electrode 111 can also be improved, so that the pattern formed by the second grid portion 202 through the cutting openings can cooperate with the shape of the edge of the first touch-control sub-electrode 111, thereby allowing the light transmittance of the first touch-control sub-electrode 111 to be more uniform, and improving the optical performance.

It should be noted that the above-mentioned second area ratio refers to the ratio of the total area of the regions occupied by all the second grid portions 202 included in each second region unit 302 to the total area of the second region unit 302. For example, the second area ratio may range from 10% to 25%, and for example, it may further range from 15% to 20%, so as to better achieve the synchronous optimization of the electrical performance and optical performance.

For example, the size of the second region unit 302 may be smaller than the size of the first region unit 301, so that the second region unit 302 can be better divided according to the shape of the edge of the first touch-control sub-electrode 111. It should be noted that in the embodiments illustrated in FIG. 5A to FIG. 5C, the second region unit 302 is represented by a triangle shape, while in some other embodiments of the present disclosure, the second region unit 302 may also be represented by other different shapes, such as a diamond shape, a hexagon shape, or other regular shapes or irregular shapes, which are not limited by the embodiments of the present disclosure. For example, the shape of the edge corresponding to the edge (for example, the first edge L1 and the second edge L2) of the first touch-control sub-electrode 111 in the second region unit 302 may be consistent with or similar to the shape of the edge of the first touch-control sub-electrode 111.

For example, the number of cutting openings for forming the second grid portion 202 in each second region unit 302 of the plurality of second region units 302 may be the same as each other, so that the uniformity and consistency of light transmittance of the first touch-control sub-electrode 111 near the edge of the first touch-control sub-electrode 111 can be further improved, and the brightness attenuation difference in different azimuth viewing angles near each edge of the first touch-control sub-electrode 111 is reduced or avoided, thereby achieving the optimization of optical performance.

For example, in some embodiments of the present disclosure, the pattern formed by the second grid portion 202 in each second region unit 302 is at least partially the same as each other, that is, the pattern contained in the grid-shaped structure in each second region unit 302 may be partially the same as each other or substantially all the same. Thus, by making the pattern composed of the second grid portion 202 in each second region unit 302 consistent with each other as much as possible, the uniformity and consistency of the light transmittance at each position of the first touch-control sub-electrode 111 can be significantly improved, and the brightness attenuation difference in different azimuth viewing angles can be reduced or avoided, so that the optical performance can be optimized.

For example, in some examples, the pattern formed by one or more second grid portions 202 in each second region unit 302 may cooperate with the pattern formed by one or more second grid portions 202 in the adjacent first region unit 301, so that the overall pattern composed of all the second grid portions 202 in the second region unit 302 and the first region unit 301 adjacent to the second region unit 302 is at least partially the same as the shape of the edge or sub-edge of the first touch-control sub-electrode 111, for example, it may be completely the same. Thus, the brightness attenuation difference in different azimuth viewing angles near each edge or sub-edge of the first touch-control sub-electrode 111 can be further alleviated or avoided, and the synchronous optimization of the electrical performance and optical performance can be achieved.

For example, FIG. 6A to FIG. 6C and FIG. 7A to FIG. 7C provide two schematic diagrams of forming a grid-shaped structure including the first grid portion 201 and the second grid portion 202 through the cutting openings CL in the second region unit 302 and the first region unit 301 adjacent to the second region unit 302, respectively.

It should be noted that, for clarity and simplicity, FIG. 6A to FIG. 6C and FIG. 7A to FIG. 7C only show the cutting openings CL for forming the first grid portion 201 and the second grid portion 202, and the specific outlines of the first grid portion 201 and the second grid portion 202 formed by the cutting openings CL are not specifically illustrated. However, it should be understood that the first grid portion 201 and the second grid portion 202 in the first region unit 301 and the second region unit 302 illustrated in FIG. 6A to FIG. 6C and FIG. 7A to FIG. 7C can be obtained according to the cutting openings CL illustrated in the figure.

Figure 6A:
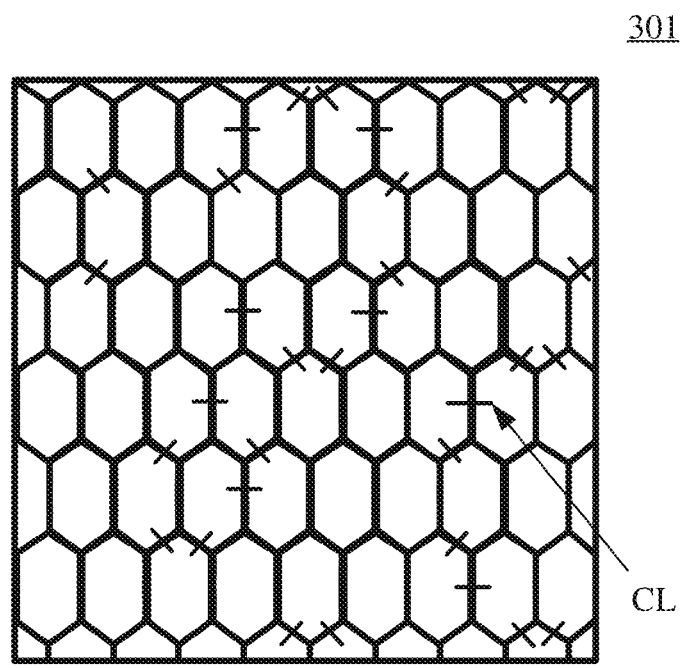
FIG. 6A to FIG. 6C are schematic diagrams of a grid-shaped structure including a first grid portion and a second grid portion formed through cutting openings in a first region unit and a second region unit which are adjacent to each other provided by some embodiments of the present disclosure.
Figure 6B:
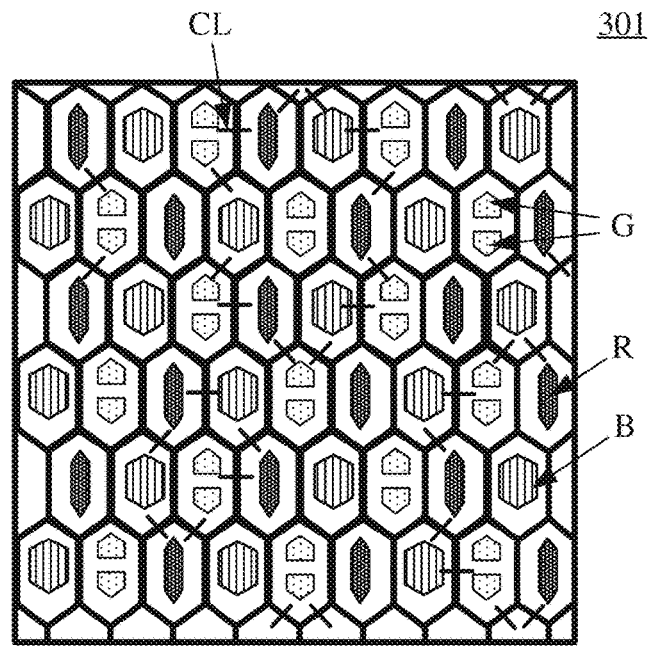
Figure 6C:
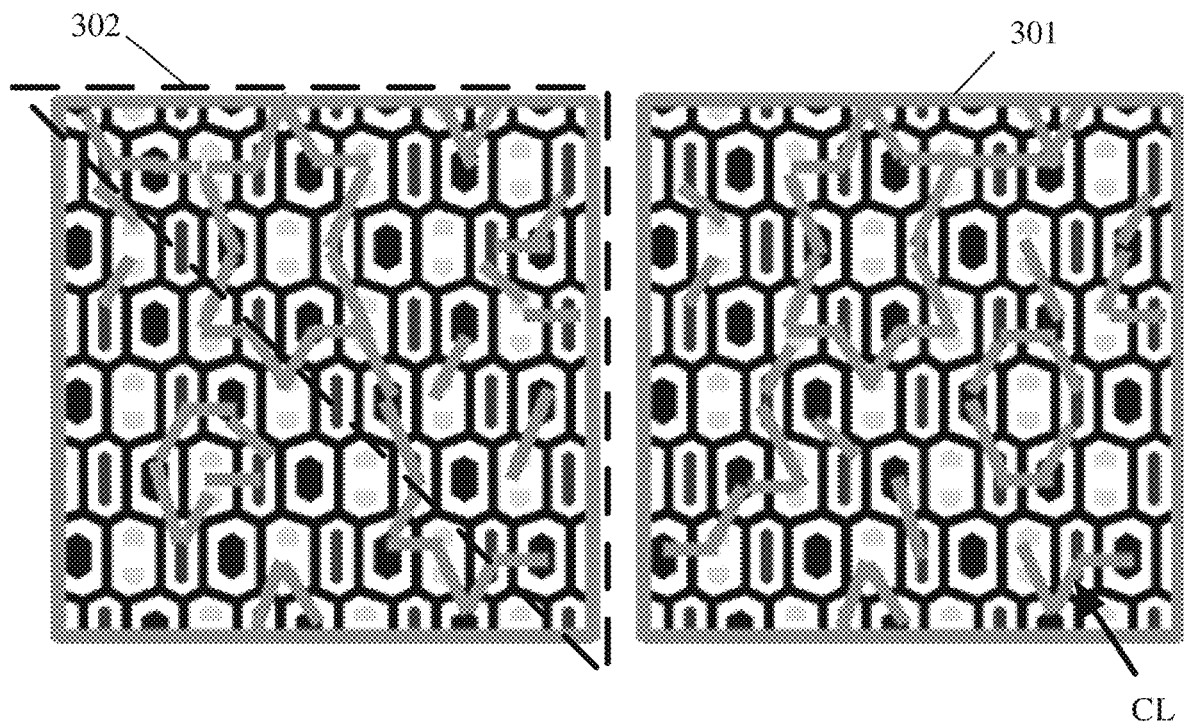
Figure 7A:
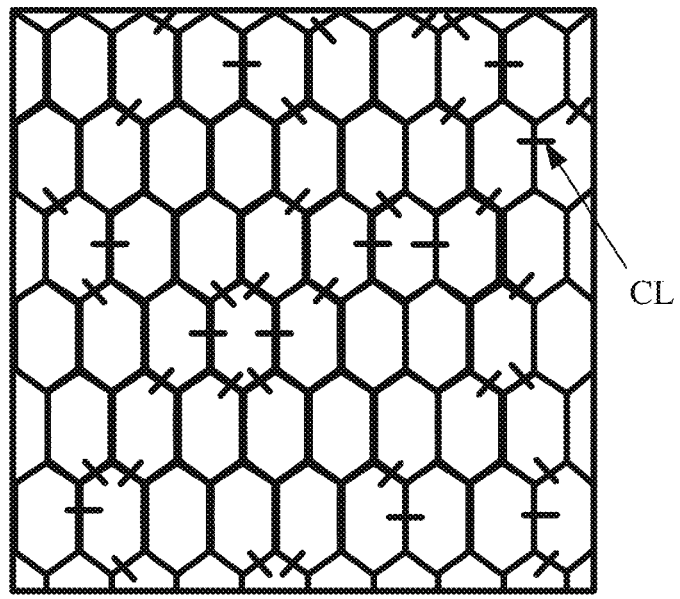
FIG. 7A to FIG. 7C are schematic diagrams of another grid-shaped structure including a first grid portion and a second grid portion formed through cutting openings in a first region unit and a second region unit which are adjacent to each other provided by some embodiments of the present disclosure.

For example, in order to better describe that the touch-control electrode structure provided by the embodiments of the present disclosure can achieve synchronous optimization of the electrical performance and optical performance, FIG. 6B to FIG. 6C and FIG. 7B to FIG. 7C further respectively show the corresponding relationship between each metal grid of the portion in the touch-control electrode structure corresponding to FIG. 6A and FIG. 7A, and the sub-pixel (for example, sub-pixels R. G and B) in the display panel in the case that the touch-control electrode structure is applied to such as a display panel on the basis of FIG. 6A and FIG. 7A. It should be noted that the arrangement of sub-pixels in the display panel is only an exemplary description and does not constitute a limitation of the present disclosure.

Figure 7B:
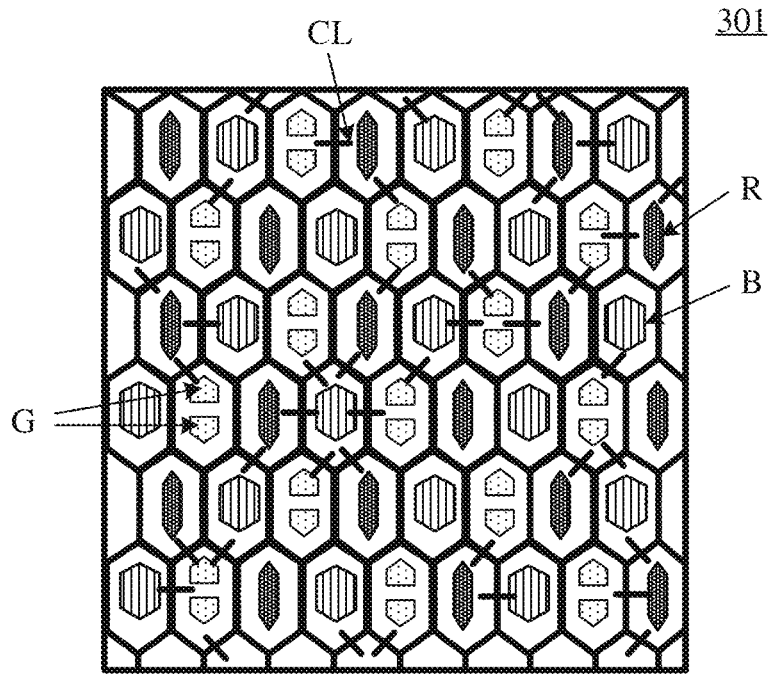
Figure 7C:
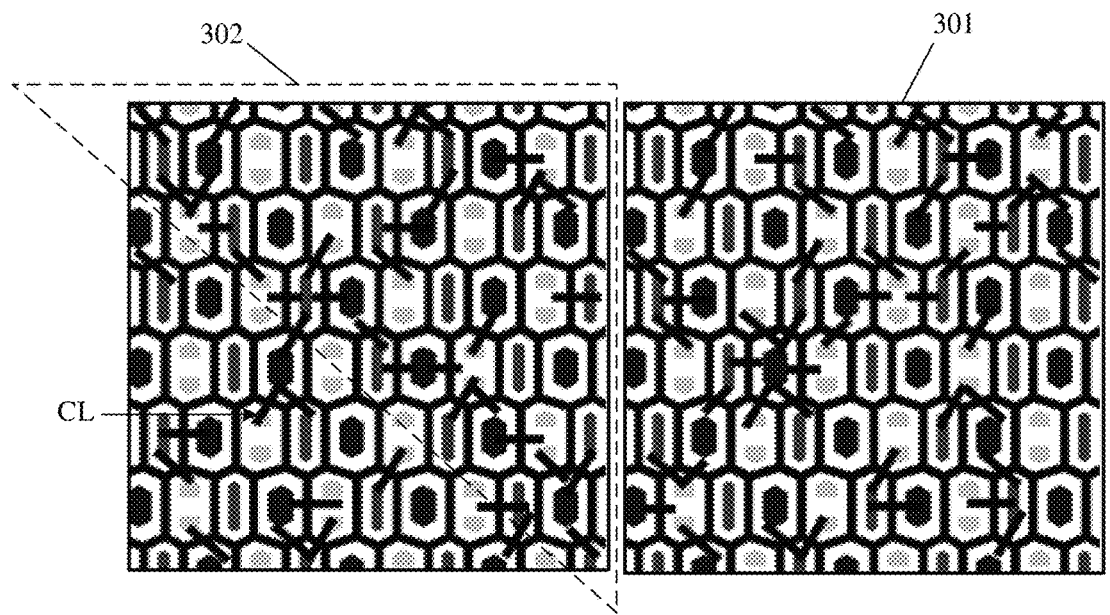

For example, FIG. 6A and FIG. 7A may respectively show one first region unit 301 in the first touch-control sub-electrode 111, and in the one first region unit 301, the corresponding first grid portion 201 and second grid portion 202 are formed through the cutting openings CL. FIG. 6B and FIG. 7B may respectively show the corresponding relationship between the first region unit 301 and the sub-pixel in the display panel (for example, the specific description may refer to the content in the embodiments of the display panel in the following). FIG. 6C and FIG. 7C respectively show a first region unit 301 and a second region unit 302 adjacent to the first region unit 301, and in the first region unit 301 and the second region unit 302 which are adjacent, the corresponding first grid portion 201 and second grid portion 202 are formed through the cutting openings CL.

For example, referring to FIG. 6C and FIG. 7C, the second grid portion 202 formed through the cutting opening CL in the second region unit 302 may cooperate with the second grid portion 202 formed through the cutting opening CL in the adjacent first region unit 301, so that the pattern, as a whole, formed by all the second grid portions 202 in the first region unit 301 and the second region unit 302 which are adjacent is substantially the same as or basically consistent with the shape of the edge or the sub-edge of the first touch-control sub-electrode 111. Thus, the brightness attenuation difference in different azimuth viewing angles at or near each edge or sub-edge of the first touch-control sub-electrode 111 can be significantly reduced or avoided, so that the synchronous optimization of the electrical performance and optical performance can be achieved.

For example, for the second touch-control sub-electrode 121, each second touch-control sub-electrode 121 may be divided into a third region unit 303 and a fourth region unit 304 as illustrated in FIG. 5B and FIG. 5C using the same division manner as the first touch-control sub-electrode 111 described above, the contents of the third region unit 303 and the fourth region unit 304 in the second touch-control sub-electrode 121 may refer to the specific description of the first region unit 301 and the second region unit 302 in the first touch-control sub-electrode 111 described above, and details will not be repeated here.

It should be noted that the number, shape, size, and the like of, for example, the first region unit 301, the second region unit 302, the third region unit 303, and the fourth region unit 304 illustrated in FIG. 5A to FIG. 5C are only exemplary descriptions, and the embodiments of the present disclosure are not limited in this aspect.

For example, in some embodiments of the present disclosure, the first touch-control electrode 110 further includes at least one connection portion, and each connection portion is located between two first touch-control sub-electrodes 111 adjacent in the second direction R2 and is integrally formed with the two first touch-control sub-electrodes 111, so as to connect the two first touch-control sub-electrodes 111 adjacent in the second direction R2. For example, the position of the connection portion in the first touch-control electrode 110 may correspond to a fifth region unit 305 illustrated in FIG. 5A.

For example, the connection portion may include a grid-shaped structure including a metal grid. For example, because of the small size of the connection portion, the connection portion may not be provided with the cutting opening, that is, the grid-shaped structure in the connection portion is a grid-shaped structure which is connected with the first grid portion 201 in the first touch-control sub-electrode 111 for transmitting a touch-control signal and is not provided with any disconnected dummy portion.

Figure 8:
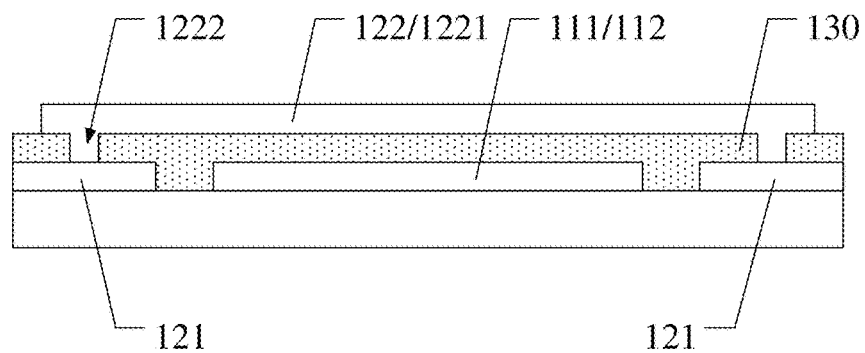
FIG. 8 is a schematic diagram of a partial cross-sectional structure of a touch-control electrode structure provided by some embodiments of the present disclosure.

For example, FIG. 8 is a schematic diagram of a partial cross-sectional structure of a touch-control electrode structure provided by some embodiments of the present disclosure. For example, FIG. 8 is a cross-sectional view taken along the line A-A' illustrated in FIG. 2.

As illustrated in FIG. 2 and FIG. 8, in the case that the first touch-control electrode 110 includes a connection portion 112, each second touch-control electrode 120 includes a plurality of second touch-control sub-electrodes 121 and at least one bridge structure 122, the plurality of second touch-control sub-electrodes 121 are arranged along the first direction R1, and each bridge structure 122 is located between two second touch-control sub-electrodes 121 adjacent in the first direction R1, so as to electrically connect the two second touch-control sub-electrodes 121 adjacent in the first direction R1.

In some embodiments of the present disclosure, as illustrated in FIG. 8, the touch-control electrode structure further includes an insulating layer 130. For example, as illustrated in FIG. 8, the insulating layer 130 is located between the plurality of first touch-control sub-electrodes 111 and the above-mentioned each bridge structure 122 and between the plurality of second touch-control sub-electrodes 121 and the above-mentioned each bridge structure 122. For example, the insulating layer 130 is located on the plurality of first touch-control sub-electrodes 111 and the plurality of second touch-control sub-electrodes 121. The bridge structure 122 of the second touch-control electrode 120 includes a conductive structure 1221, and the conductive structure 1221 is located on a side of the insulating layer 130 away from the plurality of second touch-control sub-electrodes 121 and is connected with two second touch-control sub-electrodes 121 adjacent in the first direction R1 through via holes 1222 in the insulating layer 130, respectively.

For example, the plurality of first touch-control sub-electrodes 111 and the plurality of second touch-control sub-electrodes 121 are arranged in the same layer and insulated from each other.

For example, the material of the metal grid in the grid-shaped structure of the first touch-control sub-electrode 111 and the second touch-control sub-electrode 121 includes a metal material such as aluminum, molybdenum, copper, silver, etc., or an alloy material of the metal material, for example, a silver palladium copper alloy (APC) material or the like.

For example, the material of the insulating layer 130 may be an inorganic insulating material, and for example, the inorganic insulating material is a transparent material. For example, the inorganic insulating material is an oxide of silicon, a nitride of silicon, or a nitrogen oxide of silicon, such as the silicon oxide, silicon nitride, silicon oxy-nitride, etc., or an insulating material including the metal nitrogen oxide such as alumina, titanium nitride, or the like.

For example, the material of the insulating layer 130 may also be an organic insulating material to obtain good bending resistance. For example, the organic insulating material is a transparent material. For example, the organic insulating material is the OCA optical adhesive. For example, the organic insulating material may include the polyimide (PI), acrylate, epoxy resin, polymethylmethacrylate (PMMA), etc.

It should be noted that, in other embodiments, the two first touch-control sub-electrodes 111 adjacent in the second direction R2 may also be connected through a bridge structure, and the two second touch-control sub-electrodes 121 adjacent in the first direction R1 may be connected through a connection portion which is located in the same layer as the second touch-control sub-electrode 121 and is integrally formed with the second touch-control sub-electrode 121, that is, the electrical connection manner used between the two first touch-control sub-electrodes 111 adjacent in the second direction R2 and the electrical connection manner used between the two second touch-control sub-electrodes 121 adjacent in the first direction R1 may be interchanged with each other.

In some embodiments of the present disclosure, the first touch-control electrode 110 may be a touch-control driving electrode, and the second touch-control electrode 120 may be a touch-control sensing electrode. Alternatively, the first touch-control electrode 110 may be a touch-control sensing electrode, and the second touch-control electrode 120 may be a touch-control driving electrode. The embodiments of the present disclosure are not limited in this aspect.

For example, in the case that the above-mentioned touch-control electrode structure is applied to a display panel, each first touch-control electrode 110 and each second touch-control electrode 120 may be respectively electrically connected with a signal line and connected to a touch-control controller or a touch-control integrated circuit through the signal line. Taking the first touch-control electrode 110 being the touch-control sensing electrode and the second touch-control electrode 120 being the touch-control driving electrode as an example, the touch-control integrated circuit may be, for example, a touch-control chip for providing a touch-control driving signal to the second touch-control electrode 120, receiving a touch-control sensing signal from the first touch-control electrode 110, and processing the received touch-control sensing signal. For example, the processed data/signal is provided to a system controller to achieve the touch-control sensing function. For example, one end of the signal line connected with the touch-control integrated circuit may be arranged on the same side of the touch-control region of the display panel, so as to facilitate the connection with the touch-control integrated circuit. Alternatively, a signal line may be respectively arranged at both ends of one second touch-control electrode 120. During operation, the touch-control integrated circuit simultaneously inputs a touch-control driving signal to the second touch-control electrode 120 from two sides (bilateral driving) through two signal lines, so as to improve the signal loading speed on the second touch-control electrode 120 and improve the detection speed.

For example, in the touch-control electrode structure provided by the embodiments of the present disclosure, the first direction R1 is perpendicular to the second direction R2. In the case that the touch-control electrode structure provided by the embodiments of the present disclosure is applied to a display panel, the first direction R1 may be a row direction of the sub-pixel array in the display panel, and the second direction R2 may be a column direction of the sub-pixel array in the display panel. Alternatively, the first direction R1 may be a column direction of the sub-pixel array in the display panel, and the second direction R2 may be a row direction of the sub-pixel array in the display panel. The embodiments of the present disclosure are not limited in this aspect.

In the touch-control electrode structure provided by the embodiments of the present disclosure, because both the first touch-control sub-electrode 111 and the second touch-control sub-electrode 121 have a shape similar to a diamond, and the angle between the extending direction of each side of the diamond (for example, the extending direction of each sub-edge of the first touch-control sub-electrode 111 and the second touch-control sub-electrode 121) and the first direction R1 or the second direction R2 ranges from 20° to 25°, therefore the touch-control electrode structure has a pattern different from the sub-pixel array for display, and the sub-edges of each first touch-control sub-electrode 111 and each second touch-control sub-electrode 121 can form an included angle of 20° ~25° with the row direction or column direction of the sub-pixel array, so as to further reduce or avoid the interference generated between the touch-control electrode structure and the sub-pixel array, and reduce or avoid the occurrence of such as the mura phenomenon. Moreover, because the sub-edges of each first touch-control sub-electrode 111 and each second touch-control sub-electrode 121 may form an included angle of 20° ~25° with the row direction or column direction of the sub-pixel array, in this case, the light passing through the edge or the portion near the edge of each first touch-control sub-electrode 111 and each second touch-control sub-electrode 121 may come from sub-pixels of different colors (for example, sub-pixels for displaying different colors, such as sub-pixels R, G and B). Therefore, along the edge or the portion near the edge of each first touch-control sub-electrode 111 and each second touch-control sub-electrode 121, the period of continuous appearance of sub-pixels with the same color can be shortened to the limit of human eye resolution, so that phenomena such as the mura can be effectively alleviated or eliminated.

Figures 9A, 9B:
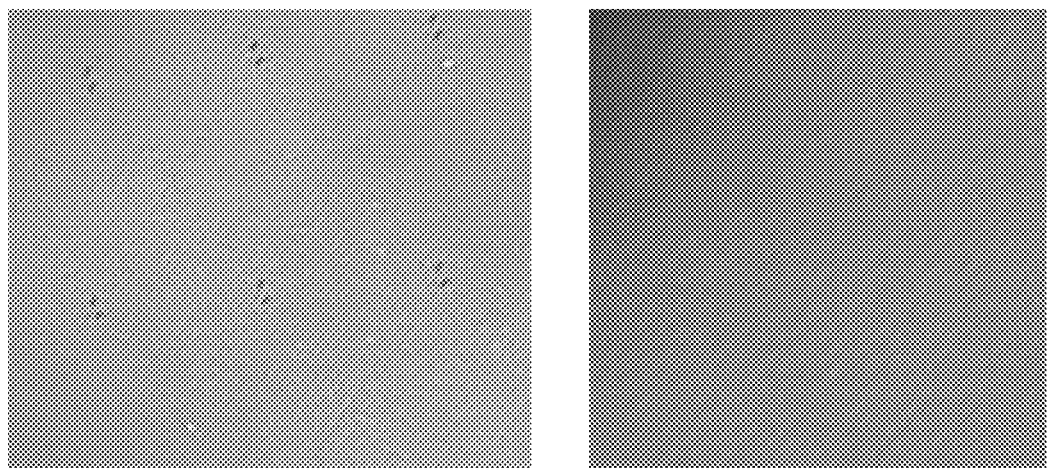
FIG. 9A is a schematic diagram showing an effect of a display image provided by a display panel adopting a touch-control electrode structure in the prior art.
FIG. 9B is a schematic diagram showing an effect of a display image provided by a display panel adopting a touch-control electrode structure provided by the embodiments of the present disclosure.

FIG. 9A is a schematic diagram showing an effect of a display image provided by a display panel adopting a touch-control electrode structure in the prior art, and FIG. 9B is a schematic diagram showing an effect of a display image provided by a display panel adopting a touch-control electrode structure provided by the embodiments of the present disclosure.

Compared with the image display effect illustrated in FIG. 9A, the dark etching pattern, mura pattern, or the like in a dot shape, a line shape, or a block shape in the image illustrated in FIG. 9B may be significantly reduced, and the display effect of the image is significantly improved. Thus, the display panel with the touch-control electrode structure provided by the embodiments of the present disclosure can achieve the synchronous optimization of the electrical performance and optical performance.

At least one embodiment of the present disclosure further provides a display panel, the display panel includes the touch-control electrode structure according to any one of the embodiments of the present disclosure, a base substrate, and a display structure, and the display structure and the touch-control electrode structure are stacked on the base substrate.

Figure 10:
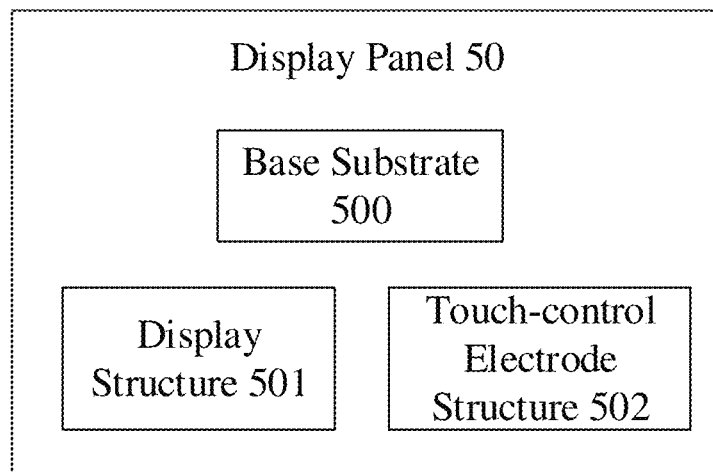
FIG. 10 is a schematic block diagram of a display panel provided by some embodiments of the present disclosure.

FIG. 10 is a schematic block diagram of a display panel provided by some embodiments of the present disclosure. For example, as illustrated in FIG. 10, the display panel 50 includes a base substrate 500, a display structure 501, and a touch-control electrode structure 502. For example, the display structure 501 and the touch-control electrode structure 502 may be stacked on the base substrate 500. For example, the touch-control electrode structure 502 may be a touch-control electrode structure according to any one of the embodiments of the present disclosure.

Figure 11:
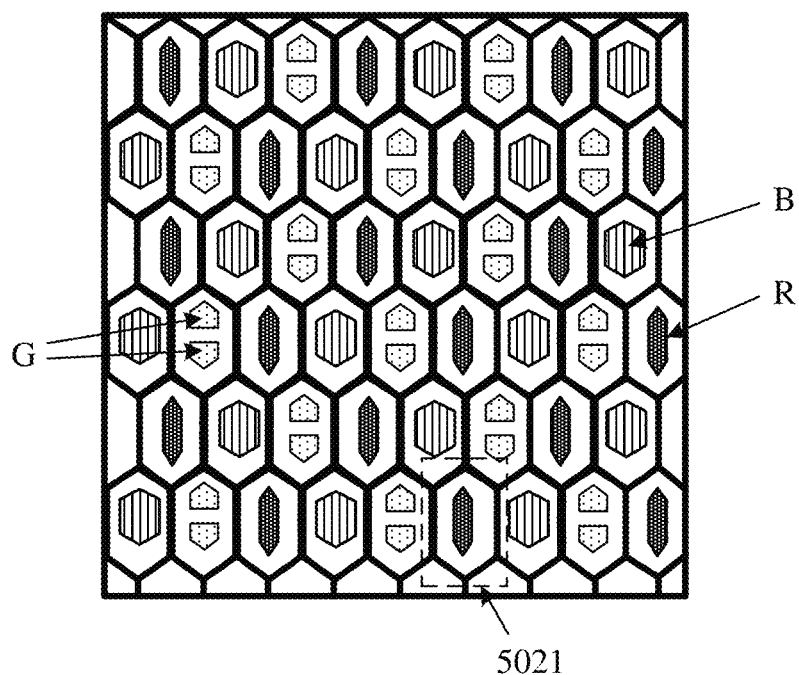
FIG. 11 is a schematic diagram of a position corresponding relationship between a sub-pixel in a display structure and a grid-shaped structure in a touch-control electrode structure of a display panel provided by some embodiments of the present disclosure.

FIG. 11 is a schematic diagram of a position corresponding relationship between a sub-pixel in a display structure and a grid-shaped structure in a touch-control electrode structure of a display panel provided by some embodiments of the present disclosure.

For example, as illustrated in FIG. 11, the display structure 501 includes a plurality of sub-pixels, such as a plurality of sub-pixels R. G and B for displaying different colors, and the size of each metal grid 5021 in the grid-shaped structure of each first touch-control sub-electrode in the touch-control electrode structure 502 is greater than the size of each sub-pixel.

For example, as illustrated in FIG. 11, one or more sub-pixels may correspond to one metal grid 5021, and the orthographic projection of the one or more sub-pixels (for example, sub-pixels R, G and B) on the base substrate 500 is located in the region surrounded by the orthographic projection of the corresponding metal grid 5021 on the base substrate 500. For example, the mesh of the metal grid 5021 covers one first sub-pixel R. and for example, may cover the pixel opening region of one first sub-pixel R; the mesh of the metal grid 5021 covers one second sub-pixel B, and for example, covers the pixel opening region of one second sub-pixel B; and the mesh of the metal grid 5021 covers two third sub-pixels G, and for example, covers pixel opening regions of the two third sub-pixels G. and the pixel opening regions of the two third sub-pixels G are arranged in pair and arranged side by side.

For example, the orthographic projection of the metal line of the metal grid 5021 on the base substrate 500 is located outside the orthographic projection of the pixel opening region of the corresponding sub-pixel on the base substrate 500, that is, falling in the region surrounded by the orthographic projection of the pixel separation region between pixel opening regions on the base substrate 500. For example, the pixel separation region may be the non-opening region of the pixel definition layer. The pixel separation region is used to separate the pixel opening regions of the plurality of sub-pixels, so as to separate the light-emitting layer of each sub-pixel to prevent color crossing.

For example, the first sub-pixel R may be a red sub-pixel, the second sub-pixel B may be a blue sub-pixel, and the third sub-pixel G may be a green sub-pixel. The embodiments of the present disclosure are not limited in this aspect.

Figure 12:
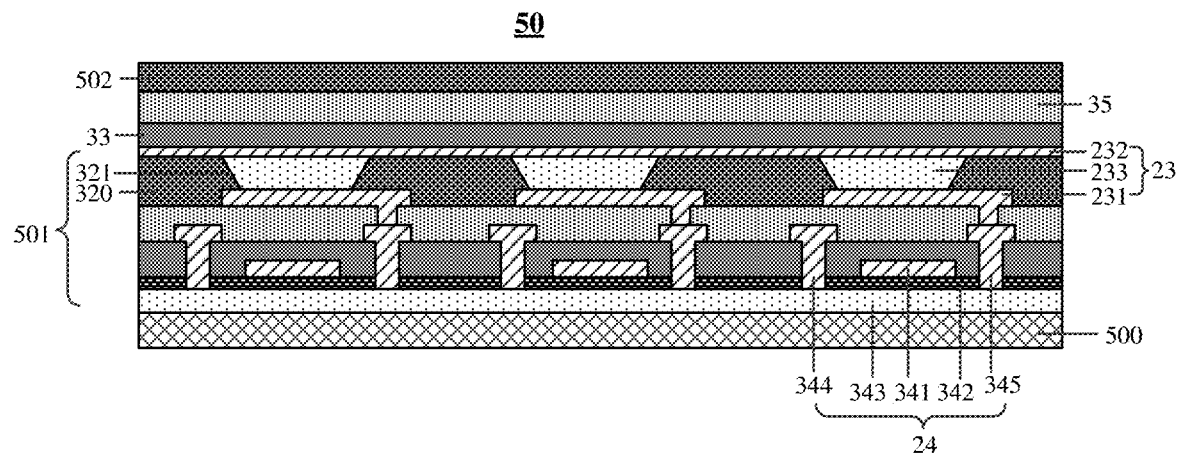
FIG. 12 is a schematic structural diagram of a specific example of a display panel provided by some embodiments of the present disclosure.

FIG. 12 is a schematic structural diagram of a specific example of a display panel 50 provided by some embodiments of the present disclosure.

As illustrated in FIG. 12, the touch-control electrode structure 502 is located on a side of the display structure 501 away from the base substrate 500, for example, on a side closer to the user during use.

For example, the embodiment takes the display panel being an OLED display panel as an example for introduction. For example, the OLED display panel may be an on-cell or in-cell touch-control display panel. Of course, in some other embodiments, the display panel may also be a liquid crystal display panel. The embodiments of the present disclosure do not limit the specific type of the display panel adopting the touch-control electrode structure provided by the embodiments of the present disclosure.

For example, the display structure 501 includes a plurality of sub-pixels arranged in the array. For example, the display panel 50 is an OLED display panel, and the plurality of sub-pixels include a green sub-pixel (for example, the third sub-pixel G), a red sub-pixel (for example, the first sub-pixel R), and a blue sub-pixel (for example, the second sub-pixel B). Each sub-pixel includes a light-emitting element 23 and a pixel driving circuit for driving the light-emitting element 23 to emit light. The embodiments of the present disclosure do not limit the type and specific composition of the pixel driving circuit, for example, the pixel driving circuit may be of a current-driving type or a voltage-driving type, may be a 2T1C driving circuit (that is, including two transistors and one capacitor, the two transistors include a driving transistor and a data writing transistor), and may further include a compensation circuit (a compensation transistor), a light-emitting control circuit (a light-emitting control transistor), a reset circuit (a reset transistor), or the like on the basis of the 2T1C driving circuit.

For clarity, FIG. 12 shows only the first transistor 24 directly electrically connected to the light-emitting element 23 in the pixel driving circuit. The first transistor 24 may be a driving transistor configured to operate in a saturated state and control the magnitude of the current for driving the light-emitting element 23 to emit light. For example, the first transistor 24 may also be a light-emitting control transistor for controlling whether the current for driving the light-emitting element 23 to emit light flows. The embodiments of the present disclosure do not limit the specific type of the first transistor.

For example, the light-emitting element 23 is an organic light-emitting diode, including a first electrode 231, a light-emitting layer 233, and a second electrode 232. One of the first electrode 231 and the second electrode 232 is an anode and the other is a cathode. For example, the first electrode 231 is an anode, and the second electrode 232 is a cathode. For example, the light-emitting layer 233 is an organic light-emitting layer or a quantum dot light-emitting layer. For example, in addition to the light-emitting layer 233, the light-emitting element 23 may further include auxiliary function layers, such as a hole injection layer, a hole transport layer, an electron injection layer, an electron transport layer, etc. For example, the light-emitting element 23 may have a top emission structure, the first electrode 231 has reflectivity, and the second electrode 232 has transmissivity or semi-transmissivity. For example, the first electrode 231 includes a high work function material to act as an anode, and for example, has an ITO/Ag/ITO stacked structure; and the second electrode 232 includes a low work function material to act as a cathode, and for example, has a semi-transmission metal or metal alloy material, such as an Ag/Mg alloy material.

The first transistor 24 includes a gate electrode 341, a gate insulating layer 342, an active layer 343, a first electrode 344, and a second electrode 345, and the second electrode 345 is electrically connected with the first electrode 231 of the light-emitting element 23. The embodiments of the present disclosure do not limit the type, material, structure, or the like of the first transistor 24. For example, the first transistor 24 may be of a top gate type, a bottom gate type, etc. For example, the active layer 343 of the first transistor 24 may be the amorphous silicon, polycrystalline silicon (low-temperature polycrystalline silicon and high-temperature polycrystalline silicon), oxide semiconductor (for example, indium gallium zinc oxide (IGZO)), etc. For example, the first transistor 24 may be an N-type transistor or a P-type transistor.

The transistors (such as the first transistor 24) used in the embodiments of the present disclosure may be thin film transistors, field effect transistors, or other switching devices with the same characteristics. The embodiments of the present disclosure take thin-film transistors as examples for description. The source electrode and the drain electrode of the transistor used here may be symmetrical in structure, and therefore there is no difference in structure between the source electrode and the drain electrode. In the embodiments of the present disclosure, in order to distinguish the two electrodes of the transistor other than the gate electrode, it is directly described that one electrode is the first electrode and the other electrode is the second electrode.

As illustrated in FIG. 12, the display structure 501 further includes a pixel definition layer 320, the pixel definition layer 320 is provided on the first electrode 231 of the light-emitting element 23, and the pixel definition layer 320 is formed with a plurality of openings 321, which respectively expose the first electrodes 231 of the plurality of sub-pixels, so as to define the pixel opening region of each sub-pixel. The light-emitting layer of the sub-pixel is formed in the pixel opening region, while the second electrode 232 is formed as a common electrode (that is, shared by a plurality of sub-pixels).

As illustrated in FIG. 12, the display structure 501 further includes an encapsulation layer 33 located between the light-emitting element 23 and the touch-control electrode structure 502. The encapsulation layer 33 is configured to seal the light-emitting element 23 to prevent external moisture and oxygen from penetrating into the light-emitting element 23 and the driving circuit and causing damage to devices such as the light-emitting element 23. For example, the encapsulation layer 33 may be a single-layer structure or a multi-layer structure, for example, including an organic film, an inorganic film, or a multi-layer structure including an organic film and an inorganic film that are alternately stacked.

For example, as illustrated in FIG. 12, the display panel 50 further includes a buffer layer 35 located between the display structure 501 and the touch-control electrode structure 502. For example, the buffer layer 35 is formed on the encapsulation layer 33 to improve the adhesion between the touch-control electrode structure 502 and the display structure 501. For example, the buffer layer 35 may be an inorganic insulating layer. For example, the material of the buffer layer 35 may be silicon nitride, silicon oxide, nitrogen oxide of silicon, etc. For example, the buffer layer 35 may also include a structure in which a silicon oxide layer and a silicon nitride layer are alternately stacked.

The display panel 50 provided by the embodiments of the present disclosure has both the touch-control function and display function, and has all the technical effects of the touch-control electrode structure provided by the above-mentioned embodiments of the present disclosure, and details are not repeated here.

At least one embodiment of the present disclosure further provides an electronic device, and the electronic device includes the display panel according to any one of the embodiments of the present disclosure, for example, the display panel 50 described above.

Figure 13:
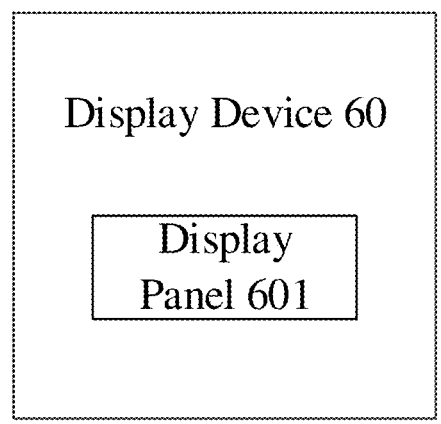
FIG. 13 is a schematic block diagram of an electronic device provided by some embodiments of the present disclosure.

FIG. 13 is a schematic block diagram of an electronic device provided by some embodiments of the present disclosure. For example, as illustrated in FIG. 13, the electronic device 60 includes a display panel 601. For example, the display panel 601 may be a display panel according to any one of the embodiments of the present disclosure, such as the display panel 50 in the above-mentioned embodiment.

For example, the electronic device may be a display apparatus or a display device having a display function and a touch-control function, such as an OLED display device, a QLED display device, or a liquid crystal display device.

For example, the electronic device may be any product or component with the display function and touch-control function, such as a display, an OLED panel, an OLED TV, a liquid crystal display panel, a liquid crystal display TV, a QLED panel, a QLED TV, an electronic paper, a mobile phone, a tablet computer, a notebook computer, a digital photo frame, a navigator, etc.

For the present disclosure, the following statements should be noted:

(1) The accompanying drawings related to the embodiment(s) of the present disclosure involve only the structure(s) in connection with the embodiment(s) of the present disclosure, and other structure(s) can be referred to common design(s).

(2) For the purpose of clarity, in accompanying drawings for illustrating the embodiment(s) of the present disclosure, the thickness of a layer or a region may be enlarged or narrowed, that is, the drawings are not drawn in a real scale. It should be understood that, in the case that a component such as a layer, a film, a region, a substrate, or the like is referred to be "on" or "under" another component, the component may be "directly" "on" or "under" the another component, or an intermediate component may be disposed therebetween.

(3) In case of no conflict, the embodiments of the present disclosure and features in one embodiment or in different embodiments can be combined to obtain new embodiments.

What have been described above merely are specific implementations of the present disclosure, and the protection scope of the present disclosure is not limited thereto. The protection scope of the present disclosure should be based on the protection scope of the claims.

What is claimed is:

1. A touch-control electrode structure, comprising:
    a plurality of first touch-control electrodes, wherein the plurality of first touch-control electrodes are arranged along a first direction, and each of the plurality of first touch-control electrodes extends in a second direction; and
    a plurality of second touch-control electrodes, wherein the plurality of second touch-control electrodes are arranged along the second direction, and each of the plurality of second touch-control electrodes extends in the first direction,
    wherein each of the plurality of first touch-control electrodes comprises a plurality of first touch-control sub-electrodes, and the plurality of first touch-control sub-electrodes are arranged along the second direction;
    each of the plurality of first touch-control sub-electrodes comprises a grid-shaped structure formed by a plurality of metal grids;
    the grid-shaped structure comprises a first grid portion and a plurality of second grid portions, the first grid portion is configured to transmit a touch-control signal, and the plurality of second grid portions are spaced apart from and insulated from the first grid portion;
    in each of the plurality of first touch-control sub-electrodes, the plurality of second grid portions are periodically arranged along an extending direction of at least one edge of the first touch-control sub-electrode;
    the first touch-control sub-electrode comprises a plurality of first region units;
    the first grid portion and the plurality of second grid portions are in the plurality of first region units, and each first region unit of the plurality of first region units comprises one or more second grid portions;
    the first touch-control sub-electrode further comprises a plurality of second region units, and the plurality of second region units are arranged around the plurality of first region units to serve as an edge portion of the first touch-control sub-electrode;
    the first grid portion and the plurality of second grid portions are further in the plurality of second region units, and each second region unit of the plurality of second region units comprises one or more second grid portions; and
    an area ratio of a region occupied by the second grid portion of each second region unit of the plurality of second region units in the each second region unit is identical and is a second area ratio.

2. The touch-control electrode structure according to claim 1, wherein the plurality of second grid portions are arranged at an equal interval in the extending direction of the at least one edge of the first touch-control sub-electrode.

3. The touch-control electrode structure according to claim 1, wherein at least part of a pattern formed by each of at least one second grid portion of the plurality of second grid portions is at least partially identical to a shape of one edge of the at least one edge of the first touch-control sub-electrode.

4. The touch-control electrode structure according to claim 1, wherein a ratio of the plurality of second grid portions in the grid-shaped structure ranges from 10% to 25%.

5. The touch-control electrode structure according to claim 1, wherein a size of a region occupied by each of the plurality of second grid portions in the first direction or the second direction is less than or equal to 0.2 mm.

6. The touch-control electrode structure according to claim 1, wherein
    an area ratio of a region occupied by the second grid portion of each first region unit of the plurality of first region units in the each first region unit is identical and is a first area ratio.

7. The touch-control electrode structure according to claim 6, wherein a ratio of a size of the first region unit to a size of the first touch-control sub-electrode ranges from 5% to 25%, and the first area ratio ranges from 10% to 25%.

8. The touch-control electrode structure according to claim 6, wherein the grid-shaped structure comprises a plurality of cutting openings to form the first grid portion and the plurality of second grid portions, and
    a count of cutting openings in each first region unit of the plurality of first region units is identical.

9. The touch-control electrode structure according to claim 6, wherein a pattern formed by the second grid portion in each first region unit of the plurality of first region units is at least partially identical.

10. The touch-control electrode structure according to claim 6, wherein the first touch-control sub-electrode comprises a first edge and a second edge which are opposite to each other in the first direction to form the first touch-control sub-electrode;
    in the first touch-control sub-electrode, the plurality of second grid portions are periodically arranged along an extending direction of the first edge and an extending direction of the second edge;
    the first edge of the first touch-control sub-electrode comprises a first sub-edge and a second sub-edge which are connected with each other, the second edge of the first touch-control sub-electrode comprises a third sub-edge and a fourth sub-edge which are connected with each other, the first sub-edge is parallel to the third sub-edge, the second sub-edge is parallel to the fourth sub-edge, and an included angle between the first sub-edge and the fourth sub-edge is equal to an included angle between the second sub-edge and the third sub-edge; and an extending direction of a pattern formed by the second grid portion in each first region unit of the plurality of first region units is parallel to an extending direction of the first sub-edge and the third sub-edge, or is parallel to an extending direction of the second sub-edge and the fourth sub-edge.

11. The touch-control electrode structure according to claim 10, wherein at least part of the pattern formed by the second grid portion in each first region unit of the plurality of first region units is at least partially identical to a shape of the first sub-edge and the third sub-edge, or at least part of the pattern formed by the second grid portion in each first region unit of the plurality of first region units is at least partially identical to a shape of the second sub-edge and the fourth sub-edge.

12. The touch-control electrode structure according to claim 10, wherein the first sub-edge, the second sub-edge, the third sub-edge, and the fourth sub-edge of the first touch-control sub-electrode respectively extend in a broken line shape.

13. The touch-control electrode structure according to claim 6, wherein the second area ratio is identical to the first area ratio.

14. The touch-control electrode structure according to claim 1, wherein a count of cutting openings for forming the second grid portion in each second region unit of the plurality of second region units is identical.

15. The touch-control electrode structure according to claim 1, wherein a minimum value of a distance between each second grid portion of the plurality of second grid portions and each edge of the first touch-control sub-electrode is approximate to or equal to a minimum value of a distance between different second grid portions.

16. The touch-control electrode structure according to claim 1, wherein the first touch-control electrode further comprises at least one connection portion, and each of the at least one connection portion is between two first touch-control sub-electrodes which are adjacent to each other in the second direction, and is integrally formed with the two first touch-control sub-electrodes, so as to connect the two first touch-control sub-electrodes which are adjacent to each other in the second direction.

17. The touch-control electrode structure according to claim 1, wherein each of the plurality of second touch-control electrodes comprises a plurality of second touch-control sub-electrodes and at least one bridge structure, the plurality of second touch-control sub-electrodes are arranged along the first direction, and each of the at least one bridge structure is between two second touch-control sub-electrodes which are adjacent to each other in the first direction, so as to electrically connect the two second touch-control sub-electrodes which are adjacent to each other in the first direction.

18. A display panel, comprising a touch-control electrode structure, a base substrate, and a display structure, wherein the display structure and the touch-control electrode structure are stacked on the base substrate;

the touch-control electrode structure comprises a plurality of first touch-control electrodes and a plurality of second touch-control electrodes;

the plurality of first touch-control electrodes are arranged along a first direction, and each of the plurality of first touch-control electrodes extends in a second direction;

the plurality of second touch-control electrodes are arranged along the second direction, and each of the plurality of second touch-control electrodes extends in the first direction;

each of the plurality of first touch-control electrodes comprises a plurality of first touch-control sub-electrodes, and the plurality of first touch-control sub-electrodes are arranged along the second direction;

each of the plurality of first touch-control sub-electrodes comprises a grid-shaped structure formed by a plurality of metal grids;

the grid-shaped structure comprises a first grid portion and a plurality of second grid portions, the first grid portion is configured to transmit a touch-control signal, and the plurality of second grid portions are spaced apart from and insulated from the first grid portion;

in each of the plurality of first touch-control sub-electrodes, the plurality of second grid portions are periodically arranged along an extending direction of at least one edge of the first touch-control sub-electrode;

the first touch-control sub-electrode comprises a plurality of first region units;

the first grid portion and the plurality of second grid portions are in the plurality of first region units, and each first region unit of the plurality of first region units comprises one or more second grid portions;

the first touch-control sub-electrode further comprises a plurality of second region units, and the plurality of second region units are arranged around the plurality of first region units to serve as an edge portion of the first touch-control sub-electrode;

the first grid portion and the plurality of second grid portions are further in the plurality of second region units, and each second region unit of the plurality of second region units comprises one or more second grid portions; and an area ratio of a region occupied by the second grid portion of each second region unit of the plurality of second region units in the each second region unit is identical and is a second area ratio.

19. The display panel according to claim 18, wherein the display structure comprises a plurality of sub-pixels, and a size of each metal grid in the grid-shaped structure of each of the plurality of first touch-control sub-electrodes is greater than a size of each sub-pixel of the plurality of sub-pixels.

* * * * *